(12) United States Patent
Genda et al.

(10) Patent No.: US 8,611,668 B2
(45) Date of Patent: Dec. 17, 2013

(54) IMAGE PROCESSING APPARATUS AND EDGE CLASSIFICATION METHOD

(75) Inventors: Daisuke Genda, Saitama (JP); Hideki Morita, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1162 days.

(21) Appl. No.: 12/539,792

(22) Filed: Aug. 12, 2009

(65) Prior Publication Data

US 2010/0040291 A1    Feb. 18, 2010

(30) Foreign Application Priority Data

Aug. 13, 2008    (JP) .................................. 2008-208404

(51) Int. Cl.
    *G06K 9/48*    (2006.01)
(52) U.S. Cl.
    USPC .......................................................... 382/199
(58) Field of Classification Search
    None
    See application file for complete search history.

(56) References Cited

U.S. PATENT DOCUMENTS

| 6,538,771 | B1 * | 3/2003 | Sakatani et al. | 358/2.1 |
| 6,950,557 | B2 * | 9/2005 | Kimura | 382/239 |
| 7,421,131 | B2 * | 9/2008 | Shaked et al. | 382/235 |
| 8,265,409 | B2 * | 9/2012 | Katagiri et al. | 382/254 |
| 2008/0159646 | A1 * | 7/2008 | Katagiri et al. | 382/266 |

FOREIGN PATENT DOCUMENTS

| JP | 2000-307869 A | 11/2000 |
| JP | 2005-176222 A | 6/2005 |

* cited by examiner

*Primary Examiner* — Vikkram Bali
(74) *Attorney, Agent, or Firm* — Holtz, Holtz, Goodman & Chick, PC

(57) ABSTRACT

Disclosed is an image processing apparatus including: an edge classification section for distinguishing an edge pattern of an edge to be included in an expanded image of a compressed image and classifying the edge by using the distinguished edge pattern, wherein the edge classification section distinguishes the edge pattern by using identification data assigned to each of the pixels of the compressed image, the identification data indicating a half tone region or a high resolution region with respect to each of the pixels, and quantized data of each of the pixels.

4 Claims, 33 Drawing Sheets

FIG.5

DIFFERENCE PLANE

| min(7) | min(6) | Max(7) | Max(6) |
|---|---|---|---|
| min(5) | min(4) | Max(5) | Max(4) |
| min(3) | min(2) | Max(3) | Max(2) |
| min(1) | min(0) | Max(1) | Max(0) |

| 3bit |
|---|
| 2bit |
| 1bit |
| 0bit |

IDENTIFICATION PLANE

| flag(b00) | flag(b01) | flag(b02) | flag(b03) |
|---|---|---|---|
| flag(b10) | flag(b11) | flag(b12) | flag(b13) |
| flag(b20) | flag(b21) | flag(b22) | flag(b23) |
| flag(b30) | flag(b31) | flag(b32) | flag(b33) |

BTC PLANE(2bits)

| BTC(b00) | BTC(b01) | BTC(b02) | BTC(b03) |
|---|---|---|---|
| BTC(b10) | BTC(b11) | BTC(b12) | BTC(b13) |
| BTC(b20) | BTC(b21) | BTC(b22) | BTC(b23) |
| BTC(b30) | BTC(b31) | BTC(b32) | BTC(b33) |

FIG.9

■ DENSITY PATTERN H0
ONE PIXEL BEING THa3 OR MORE IS INCLUDED

| a00 | a01 |
|-----|-----|
| a10 | a11 |

→ 
| 1 | 0 |
|---|---|
| 0 | 0 |
or
| 0 | 1 |
|---|---|
| 0 | 0 |
or
| 0 | 0 |
|---|---|
| 1 | 0 |
or
| 0 | 0 |
|---|---|
| 0 | 1 |
→ BTC(b00)=00

■ DENSITY PATTERN H1
TWO PIXELS BEING THa3 OR MORE ARE INCLUDED, AND FOLLOWING PATTERN

| a00 | a01 |
|-----|-----|
| a10 | a11 |

→ 
| 1 | 1 |
|---|---|
| 0 | 0 |
or
| 1 | 0 |
|---|---|
| 1 | 0 |
or
| 0 | 1 |
|---|---|
| 1 | 0 |
→ BTC(b00)=01

■ DENSITY PATTERN H2
TWO PIXELS BEING THa3 OR MORE ARE INCLUDED, AND FOLLOWING PATTERN

| a00 | a01 |
|-----|-----|
| a10 | a11 |

→ 
| 0 | 1 |
|---|---|
| 0 | 1 |
or
| 0 | 0 |
|---|---|
| 1 | 1 |
or
| 1 | 0 |
|---|---|
| 0 | 1 |
→ BTC(b00)=10

■ DENSITY PATTERN H3
THREE PIXELS BEING THa3 ARE INCLUDED

| a00 | a01 |
|-----|-----|
| a10 | a11 |

→ 
| 0 | 1 |
|---|---|
| 1 | 1 |
or
| 1 | 0 |
|---|---|
| 1 | 1 |
or
| 1 | 1 |
|---|---|
| 0 | 1 |
or
| 1 | 1 |
|---|---|
| 1 | 0 |
→ BTC(b00)=11

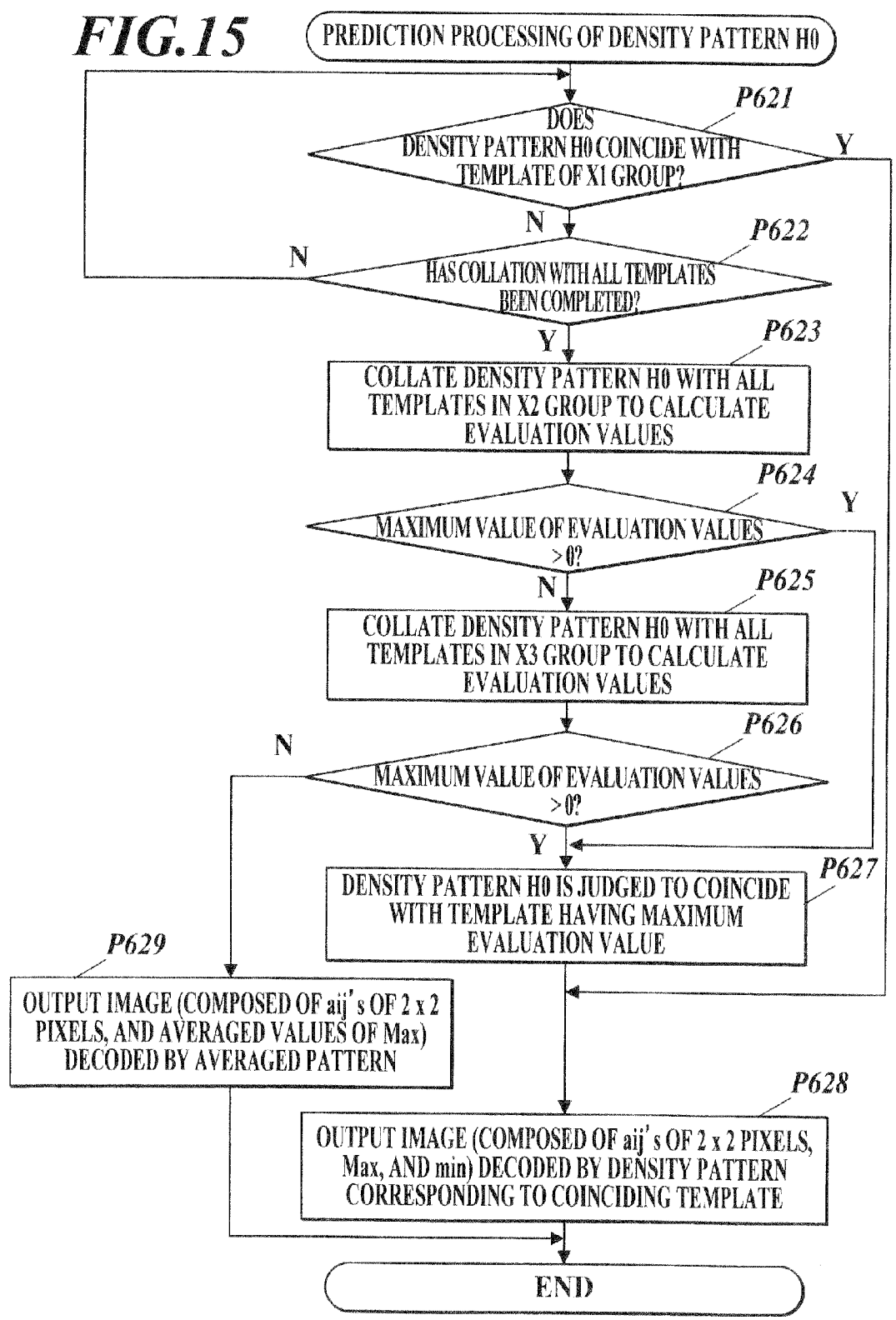

FIG.16

■ BTC(b00)=00 → DENSITY PATTERN H0

| bij | → | 1 0 / 0 0 | or | 0 1 / 0 0 | or | 0 0 / 1 0 | or | 0 0 / 0 1 |

AVERAGED PATTERN
| 1/4 | 1/4 |
| 1/4 | 1/4 |

WHEN DECODING
1 → Max
(ALL IS 1/4 Max IN CASE OF AVERAGED PATTERN)
0 → min

■ BTC(b00)=01 → DENSITY PATTERN H1

| bij | → | 1 1 / 0 0 | or | 1 0 / 1 0 | or | 0 1 / 0 1 | or | 0 0 / 1 1 |

AVERAGED PATTERN
| 1/2 | 1/2 |
| 1/2 | 1/2 |

WHEN DECODING
1 → Max
(ALL IS 1/2 Max IN CASE OF AVERAGED PATTERN)
0 → min

■ BTC(b00)=10 → DENSITY PATTERN H2

| bij | → | 0 1 / 1 0 | or | 1 0 / 0 1 |

AVERAGED PATTERN
| 1/2 | 1/2 |
| 1/2 | 1/2 |

WHEN DECODING
1 → Max
(ALL IS 1/2 Max IN CASE OF AVERAGED PATTERN)
0 → min

■ BTC(b00)=11 → DENSITY PATTERN H3

| bij | → | 0 1 / 1 1 | or | 1 0 / 1 1 | or | 1 1 / 0 1 | or | 1 1 / 1 0 |

AVERAGED PATTERN
| 3/4 | 3/4 |
| 3/4 | 3/4 |

WHEN DECODING
1 → Max
(ALL IS 3/4 Max IN CASE OF AVERAGED PATTERN)
0 → min

FIG. 17

CASE OF BTC(bij) = 00

| | X1 | | X2 | X3 | DENSITY PATTERN H0 TO BE PREDICTED |
|---|---|---|---|---|---|
| 1: C/bij, C/C | 5: C/bij, M/C | 6: M/bij, C/C | 17: C/C, C/bij | 21: M/M, M/bij | 1 0 / 0 0 |
| 2: C/C, bij/C | 7: C/M, bij/C | 8: M/C, bij/C | 18: C/C, bij/C | 22: M/M, bij/M | 0 1 / 0 0 |
| 3: bij/C, C/C | 9: bij/M, C/C | 10: bij/C, M/C | 19: bij/C, C/C | 23: bij/M, M/M | 0 0 / 1 0 |
| 4: C/bij, C/C | 11: C/bij, C/M | 12: M/bij, C/C | 20: C/bij, C/C | 24: M/bij, M/M | 0 0 / 0 1 |

COINCIDENCE CONDITIONS
C: HALF TONE CONDITIONS AND DENSITY DIFFERENCE |Cden-bijMax|<$T_C$
M: HIGH RESOLUSION CONDITION AND DENSITY DIFFERENCE |MMax-bijMax|<$T_M$

CASE OF BTC(bij) = 01

| | X1 | | | X2 | X3 | DENSITY PATTERN H1 TO BE PREDICTED |
|---|---|---|---|---|---|---|
| 1: Q Q M / Q bij Q / M Q Q | 2: Q Q Q / Q bij M / M Q Q | 5: Q Q M / Q bij Q / Q M Q | | 19: C C C / C bij C / C C C | 22: M M M / M bij M / M M M | 0 1 / 1 0 |
| 8: M1 / bij / M1 | 9: M1 / bij / M1 | 10: bij / M1 / M1 | | | | |

COINCIDENCE CONDISIONS

COINCIDENCE CONDITIONS AND DENSITY DIFFERENCE $|Cden-bijMax|<T_C$
C: HALF TONE CONDITIONS AND DENSITY DIFFERENCE $|MMax-bijMax|<T_M$
M: HIGH RESOLUSION CONDITION AND DENSITY DIFFERENCE
M1: CONDITION OF M AND DENSITY PATTERN H1
M2: CONDITION OF M AND DENSITY PATTERN H2
Q: NO CONDITIONS OF C, M, M1, AND M2 ARE SATISFIED

FIG.20

CASE OF BTC(bij) = 10

| | X1 | | | X2 | X3 | DENSITY PATTERN H2 TO BE PREDICTED |
|---|---|---|---|---|---|---|
| 4 | 5 | 12 | | 19 | 22 | $\begin{array}{\|c\|c\|} \hline 0 & 1 \\ \hline 0 & 1 \\ \hline \end{array}$ |

Cell contents (left to right, top to bottom):

- 4: Q Q M / Q bij Q / — M Q
- 5: Q M Q / Q bij Q / Q Q M
- 12: M2 / bij / M2
- 19: C C / C bij C / C C
- 22: M M / M M / M bij M / M M / M
- 15: M2 / M2 / bij
- 16: bij / M2 / M2
- 18: Q / bij M1 / Q

COINCIDENCE CONDISIONS

C: HALF TONE CONDITIONS AND DENSITY DIFFERENCE $|Cden\text{-}bijMax| < T_C$
M: HIGH RESOLUSION CONDITION AND DENSITY DIFFERENCE $|MMax\text{-}bijMax| < T_M$
M1: CONDITION OF M AND DENSITY PATTERN H1
M2: CONDITION OF M AND DENSITY PATTERN H2
Q: NO CONDITIONS OF C, M, M1, AND M2 ARE SATISFIED

CASE OF BTC(bij) = 11

| | X1 | | | | X2 | X3 | DENSITY PATTERN H3 TO BE PREDICTED |
|---|---|---|---|---|---|---|---|
| 1: C/bij, C/C | 5: C/bij, M/C | 6: M/bij, C/C | 13: M/bij, M/M | 17: C/C, C/bij, C/C (3x2) | 21: M/M, M/bij (3x2) | 1 1 / 1 0 |
| 2: C/C, bij/C | 7: C/M, bij/C | 8: M/C, bij/C | 14: M/M, bij/M | 18: C/C/C, C/bij/C | 22: M/M/M, bij/M | 1 1 / 0 1 |
| 3: bij/C, C/C | 9: bij/M, C/C | 10: bij/C, M/C | 15: bij/M, M/M | 19: C/bij/C, C/C/C | 23: bij/M/M, M/M/M | 0 1 / 1 1 |
| 4: C/bij, C/C | 11: C/bij, C/M | 12: M/bij, M/C | 16: M/bij, M/M | 20: C/bij/C, C/C/C | 24: M/bij/M, M/M/M | 1 0 / 1 1 |

COINCIDENCE CONDISIONS
  C: HALF TONE CONDITIONS AND DENSITY DIFFERENCE |Cden-bijMax|<$T_C$
  M: HIGH RESOLUSION CONDITION AND DENSITY DIFFERENCE |MMax-bijMax|<$T_M$

FIG.23A
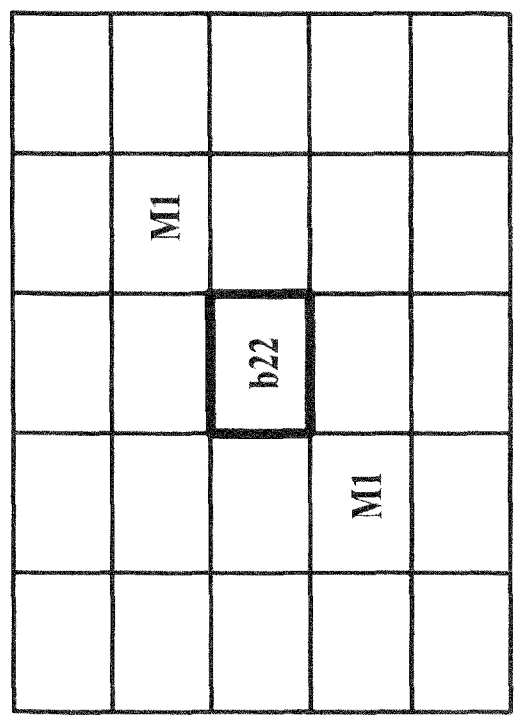
TEMPLATE 8
(CASE OF BTC(bij) = 01)
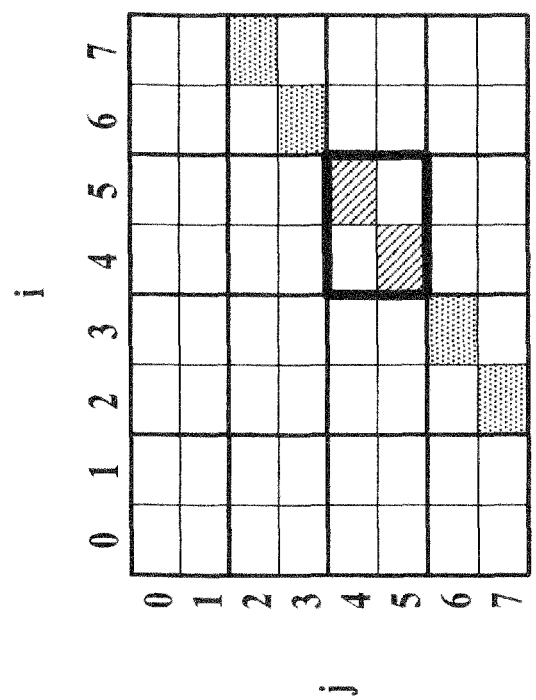
ORIGINAL IMAGE

| EDGE CLASSIFICATIONS | MARKS INDICATING EDGE CLASSIFICATIONS | EDGE SIGNALS Ed |
|---|---|---|
| NON-EDGE | nE | 000–011 |
| THIN LINE OF ONE-PIXEL WIDTH | EA0 | 100 |
| THIN LINE OF TWO-PIXEL WIDTH | EA1 | 101 |
| OUTER EDGE | EA2 | 110 |
| INNER EDGE | EA3 | 111 |

| b11 | b12 | b13 |
|---|---|---|
| b21 | b22 | b23 |
| b31 | b32 | b33 |

FIG.34
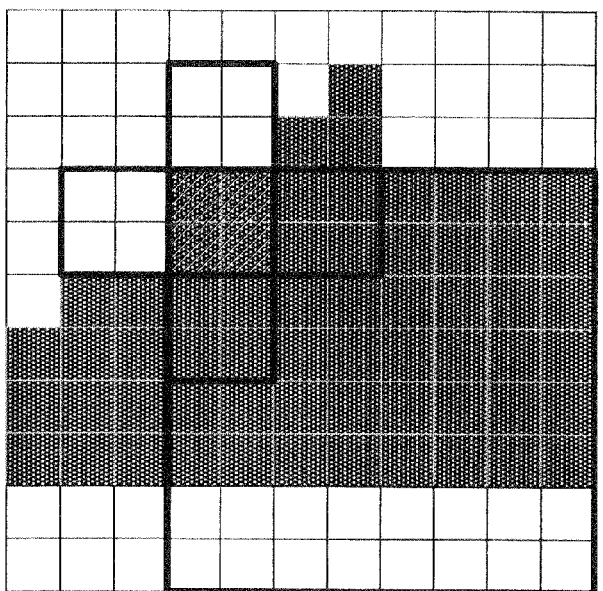
PROCESSING UNIT OF
COMPRESSION OR EXPANSION
EDGE
CLASSIFICATION
OF WATCHING
PIXEL
| FA2 | FA2 |
|-----|-----|
| FA2 | FA3 |
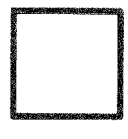 : bij
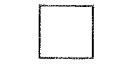 : aij
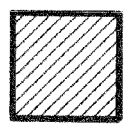 : WATCHING PIXEL
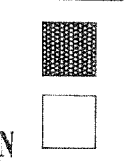 : 255
: 0
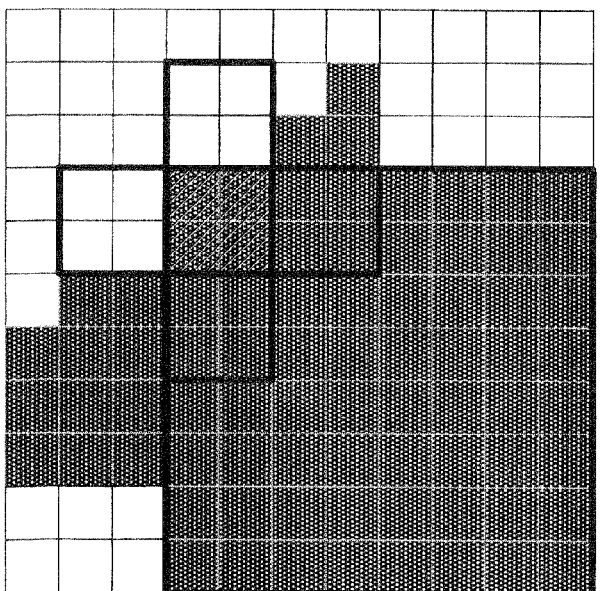
EDGE
CLASSIFICATION
OF WATCHING
PIXEL
| FA2 | FA2 |
|-----|-----|
| FA2 | FA3 |
PROCESSING UNIT OF
COMPRESSION OR EXPANSION

FIG.35
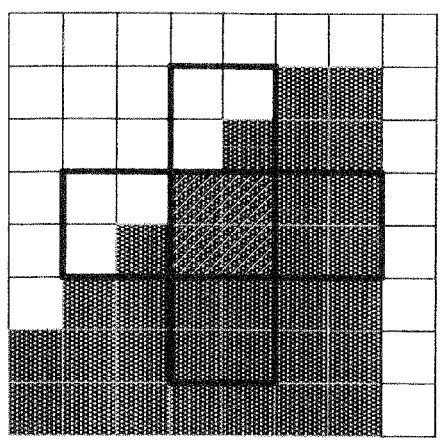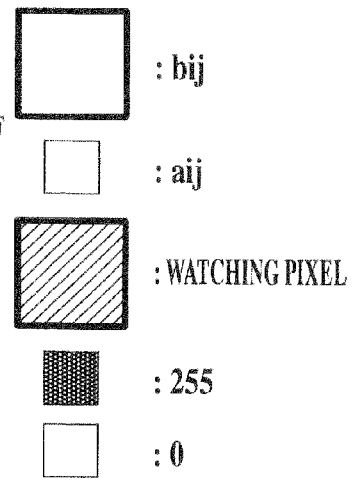
FIG.36
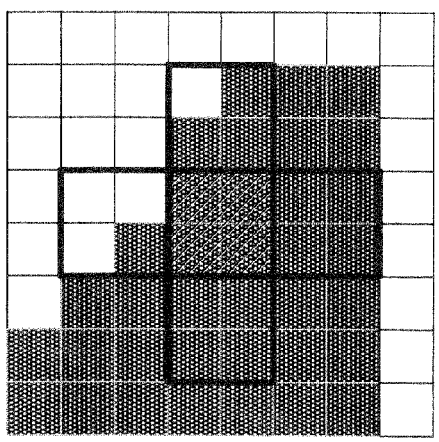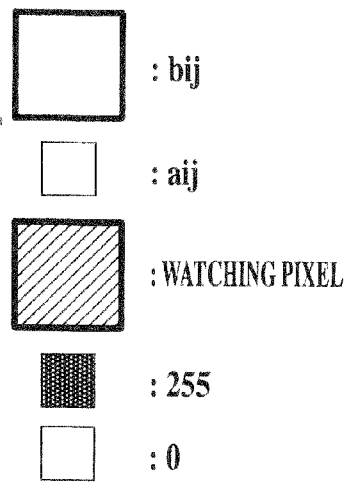

FIG.38
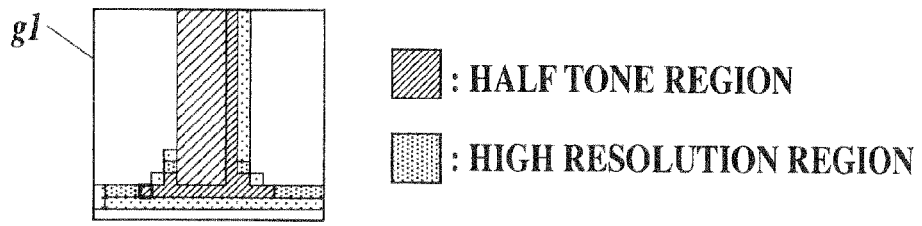
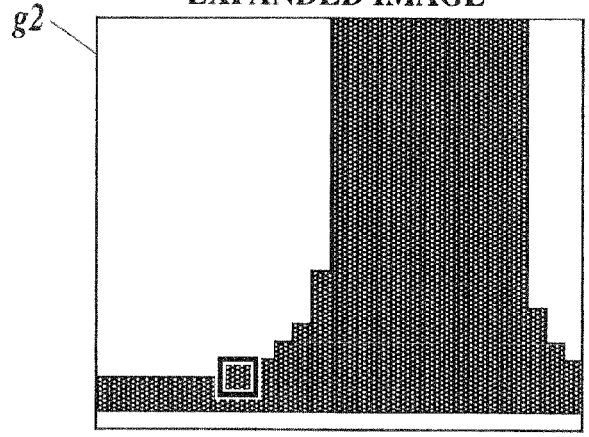
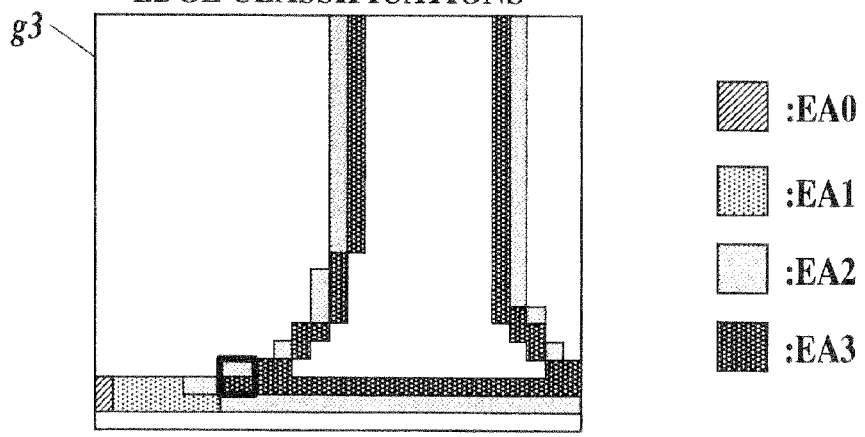

IMAGE PROCESSING APPARATUS AND EDGE CLASSIFICATION METHOD

BACKGROUND OF THE INVENTION

1. Field of the Invention

The present invention relates to an image processing apparatus and an edge classification method.

2. Description of Related Art

Because a character and a line drawing are required to have a sharpness property, their edge parts are sometimes subjected to image processing different from that to the other regions. For example, edge enhancement processing is performed to an edge part, or screen processing is performed only to an edge part with a screen having a linear density different from those of the other regions. Moreover, it is sometimes judged whether an edge is an outer edge corresponding to a contour part or an inner edge situated on an inner part of the outer edge among the edges, and thereby different processing is performed to each of the outer edge and the inner edge. Alternatively, the signal values on the outer edge and the inner edge are sometimes operated, and thereby the balance between thinning and edge enhancement is attained.

Many judging methods of outer edges and inner edges have been proposed hitherto (see, for example, Japanese Patent Application Laid-open Publications Nos. 2000-307869 and 2005-176222). Japanese Patent Application Laid-Open Publication No. 2000-307869 discloses the method of judging the inside and the outside of an edge on the basis of brightness data, and Japanese Patent Application Laid-open Publication No. 2005-176222 discloses the method of performing edge enhancement before judging the inside and the outside of the edge on the basis of the positive and negative of the sign of the signal value.

In a printer or the like, an image is frequently saved once by being compressed and is expanded at the time of being printed. At this time, if the judgment of an edge is performed after expansion, then a line memory for holding an image and the processing circuit of the data become larger by the degree of the largeness of the data quantity of the image in comparison with that of the compressed data, and their costs become higher.

Also the case of being subjected to resolution conversion is similar. If an original image is subjected to resolution conversion to have lower resolution to be saved and is subjected to resolution conversion to that of the original image at the time of printing the image, then the cost of performing edge judgment in the state of high resolution becomes higher than that in the state of low resolution.

SUMMARY OF THE INVENTION

The present invention aims to perform edge classification with a simple configuration.

According to a first aspect of the present invention, there is provided an image processing apparatus including: an edge classification section for distinguishing an edge pattern of an edge to be included in an expanded image of a compressed image and classifying the edge by using the distinguished edge pattern, wherein the edge classification section distinguishes the edge pattern by using identification data assigned to each of the pixels of the compressed image, the identification data indicating a half tone region or a high resolution region with respect to each of the pixels, and quantized data of each of the pixels.

According to a second aspect of the present invention, there is provided an edge classification method including the steps of: distinguishing an edge pattern of an edge to be included in an expanded image of a compressed image by using identification data indicating a half tone region or a high resolution region with respect to each of pixels of the compressed image, and quantized data of each of the pixels; and classifying the edge according to the distinguished edge pattern.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a diagram showing a data configuration of the compressed image;

FIG. 9 is a diagram showing correspondence relations between density patterns and quantized data;

FIG. 15 is a flow chart showing prediction processing of a density pattern H0;

FIG. 16 is a diagram showing density patterns to be predicted and decoding conditions;

FIG. 17 is a diagram showing correspondence relations between templates to be used for predictions and density patterns to be predicted;

FIG. 18 is a diagram showing correspondence relations between templates to be used for predictions and density patterns to be predicted;

FIG. 19 is a diagram showing correspondence relations between templates to be used for predictions and a density pattern to be predicted;

FIG. 20 is a diagram showing correspondence relations between templates to be used for predictions and a density pattern to be predicted;

FIG. 21 is a diagram showing correspondence relations between templates to be used for predictions and density patterns to be predicted;

FIG. 22 is a diagram showing correspondence relations between templates to be used for predictions and density patterns to be predicted;

FIG. 23A is a diagram showing an original image and a template to be used for a prediction;

FIG. 34 is a diagram showing edge patterns and edge classifications of watching pixels in the patterns;

FIG. 35 is a diagram showing an edge pattern and an edge classification of watching pixels in the pattern;

FIG. 36 is a diagram showing an edge pattern and an edge classification of watching pixels in the pattern;

FIG. 38 is a diagram showing a processing result of edge classification processing.

DESCRIPTION OF THE PREFERRED EMBODIMENTS

In the following, an embodiment according to the image processing apparatus and the edge classification method of the present invention will be described with reference to the accompanying drawings.

With regard to the present embodiment, the example of applying the present invention to a multi function peripheral (MFP) will be described. The MFP is a composite type image formation apparatus equipped with a plurality of functions, such as a copy function and a print function.

Figure 1:
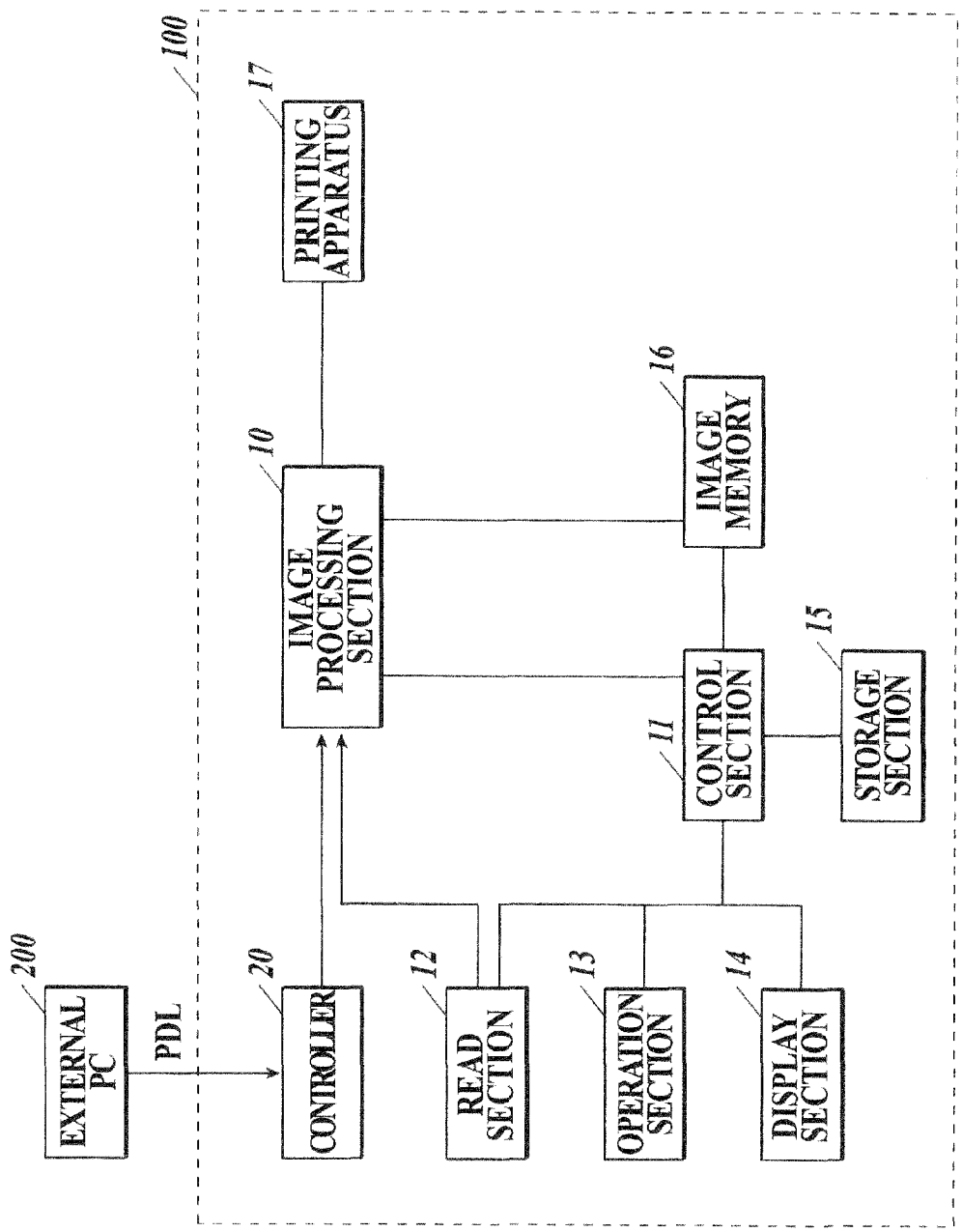
FIG. 1 is a diagram showing the functional configuration of a multifunction peripheral (MFP) according to the present embodiment.

FIG. 1 shows the configuration of an MFP 100 according to the present embodiment.

The MFP 100 is connected to an external personal computer (PC) 200, and can generate image data on the basis of page description language (PDL) format data transmitted from the external PC 200 to print the generated image data.

As shown in FIG. 1, the MFP 100 includes a controller 20, an image processing section 10, a control section 11, a read section 12, an operation section 13, a display section 14, a storage section 15, an image memory 16, and a printing apparatus 17.

The controller 20 generates image data every pixel by rasterization processing.

For example, the data of a document produced by the external PC 200 is converted into the data of the PDL format by printer driver software, and the converted data is transmitted to the controller 20. Accordingly, the controller 20 generates image data every pixel by rasterization processing. In the rasterization processing, the controller 20 analyzes a PDL command and generates the data of images, each having one of the colors of cyan (C), magenta (M), yellow (Y), and black (K), every image unit to be rendered (this is referred to as an object). That is, pixels are assigned to an object to be rendered, and a data value is set to each of the assigned pixels. Thereby the data of an image is generated.

Incidentally, although the configuration of incorporating the controller 20 in the MFP 100 has been described in the present embodiment, the configuration of providing the controller 20 on the outside of the MFP 100 may be adopted.

The control section 11 is equipped with a central processing unit (CPU), a random access memory (RAM), and the like. The control section 11 performs various operations in cooperation with various processing programs stored in the storage section 15, and performs the integrated control of each section of the MFP 100.

The read section 12 is equipped with a scanner including an optical system and a charge coupled device (CCD), and generates an image signal (analog signal) by performing the light scanning of an original sheet. The generated image signal is subjected to various kinds of correction processing in a not-shown processing section before being subjected to digital conversion to be output to the image processing section 10.

The operation section 13 is a section for an operator to input an operation instruction, and is equipped with various keys, a touch panel, which is configured to be in a body with the display section 14, and the like. The operation section 13 generates an operation signal according to an operation and outputs the generated operation signal to the control section 11.

The display section 14 displays an operation screen on a display in conformity to the control of the control section 11.

The storage section 15 stores parameters, set data, and the like, which are necessary for processing, in addition to various processing programs.

The image memory 16 is a memory for storing the data of an image.

The printing apparatus 17 performs printing on the basis of an image to be printed, which image is input from the image processing section 10. The image to be printed is the image generated by the controller 20 and subjected to necessary image processing by the image processing section 10.

The printing apparatus 17 performs printing by the electrophotographic printing system, and is composed of, for example, a paper feeding section, an exposing section, a developing section, and a fixing section. At the time of printing, the exposing section radiates a laser light onto a photosensitive drum on the basis of the data of an image to form an electrostatic latent image. Then, the printing apparatus 17 forms a toner image by developing the electrostatic latent image with the developing section before transferring the toner image onto a sheet of paper fed from the paper feeding section to perform the fixing of the toner image on the sheet of paper with the fixing section.

Next, the image processing section 10 will be described with reference to FIG. 2.

An image input from the controller 20 is once saved in the image memory 16, and is read from the image memory 16 to be output to the printing apparatus 17 when a printing instruction is issued.

The image processing section 10 performs compression processing to an image and resolution conversion of the image to low resolution at the time of storing the image into the image memory 16. On the other hand, the image processing section 10 performs expansion processing to an image read out from the image memory 16 and performs resolution conversion to the image for returning the resolution of the image to the original resolution thereof. After that, the image processing section 10 performs image processing such as rotation, reduction and expansion, density correction processing, screen processing, thinning processing, and edge enhancement processing of an image to generate an image to be printed, and outputs the generated image to the printing apparatus 17.

Figure 2:
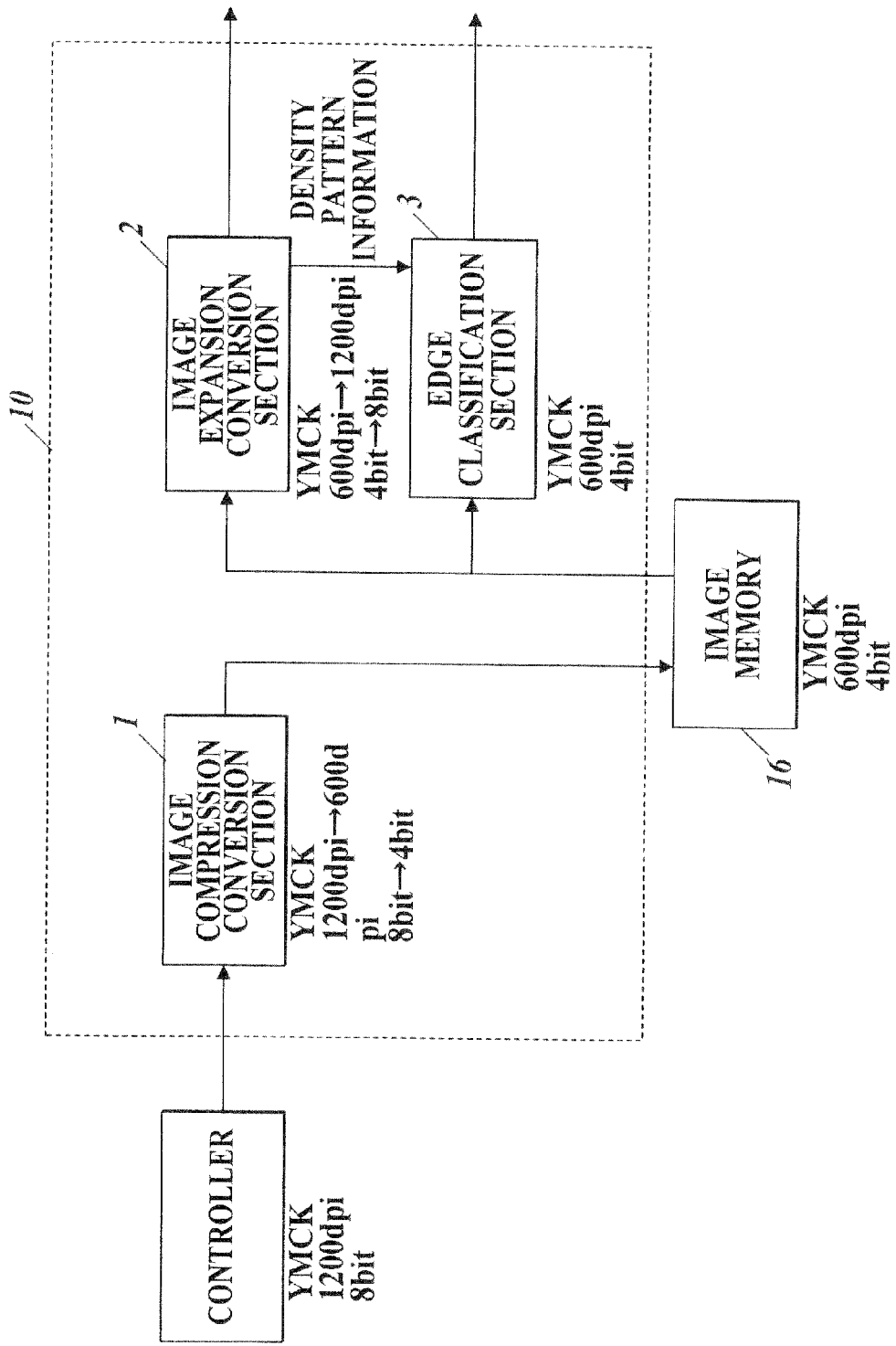
FIG. 2 is a diagram showing components to mainly function at the time of the processing of compression and expansion in an image processing section of FIG. 1.

FIG. 2 is a diagram showing an image compression conversion section 1 and an image expansion conversion section 2, which mainly function at the time of performing compression processing or expansion processing, in the processing section 10. An edge classification section 3 is provided at the preceding stage of the image expansion conversion section 2. Each of the image compression conversion section 1, the image expansion conversion section 2, and the edge classification section 3 is composed of an image processing circuit, a line memory to hold image data, and the like.

The edge classification section 3 uses a compressed image to distinguish (or detect) an edge pattern of an edge to be included in an expanded image produced by expanding the compressed image, and performs edge classification according to the pattern. The edge classification by the edge classification section 3 is performed in order to make it possible to perform image processing according to edge classification. Since the classification is performed with the use of the compressed image, the edge classification section 3 is provided at the preceding stage of the image expansion conversion section 2 to expand a compressed image.

Compression processing and expansion processing will be described before, and then the processing of edge classification will be described.

<Compression Processing>

The flow of the processing of the image compression conversion section 1 at the time of compression processing will be described with reference to FIG. 3. The description will be given here to the example of generating a compressed image by compressing an original image, which has been generated with regard to each color of C, M, Y, and K to have the resolution of 1200 dpi and is composed of the data of 8 bits per pixel, to the data of 4 bits per pixel, and by performing the of resolution conversion to 600 dpi as shown in FIG. 4. Incidentally, since the compression is performed by the block of 8×8 pixels, FIG. 4 shows an original image of the 8×8 pixels (1200 dpi) and a compressed image of 4×4 pixels (600 dpi) corresponding to the region of the original image.

FIG. 5 shows a data configuration of the compressed image (600 dpi, 4 bits, 4×4 pixels) of FIG. 4.

As shown in FIG. 5, the compressed image is composed of data of 4 bits per pixel, and a region for holding the compressed image is formed in the line memories which are used in the image compression conversion section 1 and the image expansion conversion, section 2, and the image memory 16. That is, 4 data layers (referred to as planes), each layer having 4×4 pixels per bit of each pixel, are formed.

As shown in FIG. 5, quantized data BTC(bij) of 2 bits of the compressed image is held in the data layers at $0^{th}$ and $1^{st}$ bits. The data layers at the $0^{th}$ and $1^{st}$ bits are referred to as a BTC plane.

A data value of 1 bit of an identification flag flag(bij) is held in the data layer at a $2^{nd}$ bit. The identification flag is identification data used for identifying a decoding method. The data layer at the $2^{nd}$ bit is referred to as an identification plane.

A maximum value and a minimum value (both having 8 bits) in a block of 8×8 pixels of the original image are held in the data layer at a $3^{rd}$ bit. In FIG. 5, the maximum value is denoted by Max(k), and the minimum value is denoted by min(k) (k denotes a bit position. 0≤k≤7). The data values of 8 bits are held at positions determined by k according to bit positions among 2×4 pixels determined to each of the maximum value and the minimum value. The data layer at the $3^{rd}$ bit is referred to as a difference plane.

Figure 3:
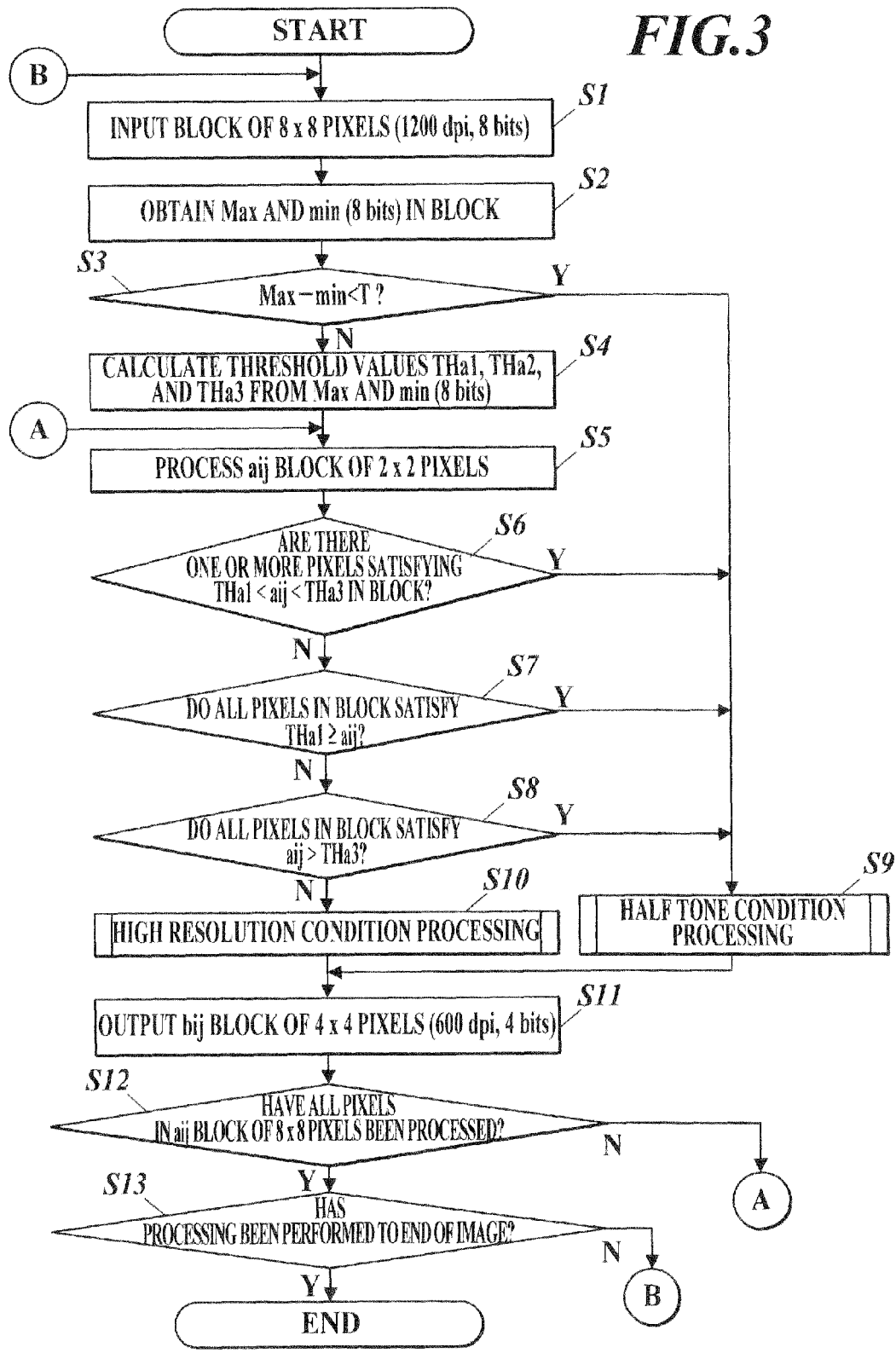
FIG. 3 is a flow chart showing the compression processing.
Figure 4:
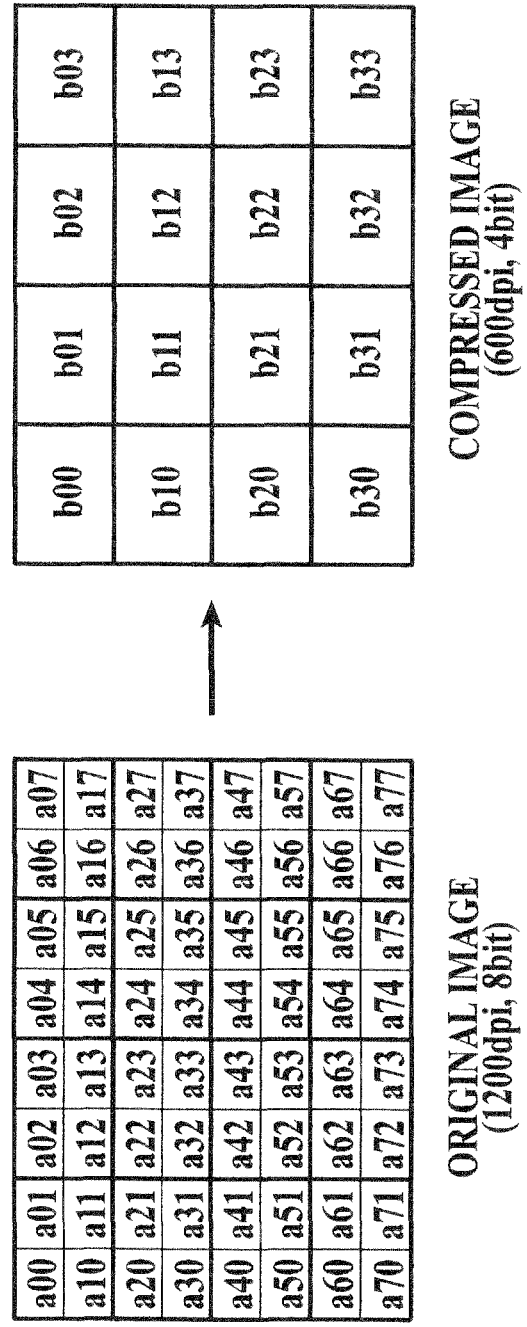
FIG. 4 is a diagram showing an original image and a compressed image before and after the compression processing.

When an original image is input from the controller 20, the image compression conversion section 1 extracts an image by the block of 8×8 pixels from the input image (1200 dpi, 8 bits) as shown in FIG. 3, and inputs the extracted image (Step S1). Then, the image compression conversion section 1 obtains the maximum value Max and the minimum value min among the data values of the pixels in the block (Step S2). Since the data value of a pixel indicates the density value thereof after printing, the maximum value Max is the maximum density value and the minimum value min is the minimum density value among the 8×8 pixels.

In the example shown in FIG. 4, each pixel of the 8×8 pixels of the original image (1200 dpi, 8 bits) are denoted by aij (0≤i≤7, 0≤j≤7), and each pixel of the 4×4 pixels of the compressed image (600 dpi, 4 bits) is denoted by bij (0≤i≤3, 0≤j≤3). In the following, the data values of the pixels aij's and bij's will be sometimes denoted by aij's and bij's, respectively. In the original image, the maximum value Max is the maximum value among the pixels aij's, and the minimum value min is the minimum value among the pixels aij's. The maximum value Max and the minimum value min of the original image are also the maximum value Max and the minimum value min of the compressed image, respectively.

Next, quantization is performed. The quantization is performed by a different quantization method according to a pixel being in a half tone region or in a high resolution region. The half tone region is an image region in which the maintenance of the high resolution is not especially required. For example, an image part having a half tone density, an image part in which the densities between adjacent pixels are comparable levels (density differences are small), although the image part has not a half tone, and the like are included in the concept of the half tone region. Incidentally, there is even the case of a half tone region including an edge. The high resolution region indicates an image part in which the maintenance of high resolution is required. For example, image parts such as an edge part of an object, a thin line structure, and an isolated point are the high resolution regions. Resolution is regarded as important rather than gradation in the high resolution region, but gradation is regarded as important rather than resolution in the half tone region. Since the required image quality is different according to the characteristic of an image as mentioned above, images are classified into the high resolution regions and the half tone regions, and the quantization of the respective regions are performed by different methods.

Accordingly, the image compression conversion section 1 regards a region satisfying the following half tone conditions as a half tone region and regards a region satisfying the following high resolution condition as a high resolution region in an original image. The judgment whether the conditions are satisfied or not is performed by the small region of 2×2 pixels (corresponding to 1 pixel bij of a compressed image) of an original image pixels aij's of 8×8 pixels, which small region is produced by subdividing the original image pixels aij's. Moreover, the image compression conversion section 1 calculates threshold values THa1-THa3 expressed by the following formulae and uses the threshold values THa1-THa3 at the time of judgment.

$$THa1=\min+(\text{Max}-\min)\times\tfrac{1}{6}$$

$$THa2=\min+(\text{Max}-\min)\times\tfrac{3}{6}$$

$$THa3=\min+(\text{Max}-\min)\times\tfrac{5}{6}$$

Then, the image compression conversion section 1 judges it by the 2×2 pixels whether any of the following half tone conditions (D11)-(D14) is satisfied or not. If any of the half tone conditions (D11)-(D14) is satisfied, then the image compression conversion section 1 judges that the pixels aij's of the 2×2 pixels are those in a half tone region.

(D11): the case where even 1 pixel among 4 pixels aij's satisfies the condition of THa1<aij≤THa3;

(D12): the case where all of the 4 pixels aij's satisfy the condition of aij≤THa1;

(D13): the case where all of the 4 pixels aij's satisfy aij>THa3;

(D14): the case where the maximum value Max and the minimum value min satisfy the relational expression of Max−min<T (0≤T≤255).

T is the difference between the maximum value Max and the minimum value min, that is, a threshold value set for judging whether the density difference in the region of 8×8 pixels is small or not. For example, a value such as T=30 can be set.

By means of the half tone conditions (D11)-(D14), the image compression conversion section 1 can judge whether a region of the pixels aij's of 2×2 pixels has a half tone density or not, whether all of the density values are in the neighborhood of the maximum value Max or the minimum value min and have comparable level densities or not, or whether density changes are small or not.

Incidentally, as mentioned above, even a half tone region satisfying the aforesaid conditions (D11)-(D14) sometimes includes an edge. In the case of satisfying the aforesaid conditions (D11)-(D14), there is the case where it is not known whether an edge is included or not only from a region of 2×2 pixels but an edge is included in the region of the 2×2 pixels when the region is viewed in relation to peripheral pixels. For example, the case is such one in which the pixels aij's of the 2×2 pixels constitute an end of a character object and all of the pixels aij's of the 2×2 pixels has the maximum density value 255 but the pixels aij's of the peripheral pixels have the minimum density value 0. In this case, the density differences between the pixels aij's of the 2×2 pixels and the pixels aij's of the peripheral pixels are large to be 255, and the pixels aij's of the 2×2 pixels include an edge. But since the pixels aij's of the 2×2 pixels satisfy the condition (D13), the pixels aij's of the 2×2 pixels are judged to be a half tone region.

On the other hand, if pixels aij's of 2×2 pixels satisfy the following high resolution condition (B1), then the pixels of the 2×2 pixels are judged to be pixels in a high resolution region.

(B1) the case where the pixels satisfying the condition of aij≤Tha1 and the pixels satisfying the condition of aij>Tha3 are mixed in 4 pixels aij's.

That is, by mans of the high resolution condition (B1), the image compression conversion section 1 can judge whether a region of the pixels aij's of the 2×2 pixels is a high resolution region, in which density changes are large, or not.

As mentioned above, it is impossible to judge whether an edge is included in a region of 2×2 pixels or not by the half tone conditions (D11)-(D14). On the other hand, it is possible to judge whether an edge is included in a region of 2×2 pixels by the high resolution condition (B1) on the basis of the existence of a density difference. That is, the high resolution region is a region judged to include an edge in the compression processing.

As the flow of the processing, as shown in FIG. 3, the image compression conversion section 1 first judges whether the maximum value Max and the minimum value min satisfy the condition of (Max−min)<T or not (Step S3). If the condition is satisfied (Step S3: Y), then the image compression conversion section 1 considers the region of 2×2 pixels to satisfy the half tone condition (D14) to advance the processing to half tone condition processing of performing quantization according to a half tone region (Step S9). Also if the maximum value Max and the minimum value min do not satisfy the condition of (Max−min)<T (Step S3: N), the image compression conversion section 1 calculates the threshold values THa1-THa3 (Step S4), and sets the pixels aij's of the 2×2 pixels as processing objects (Step S5) to judge whether the pixels aij's satisfy the half tone conditions (D11)-(D13) or not (Steps S6-S8).

For example, if the pixels a00, a01, a10, and all of the original image of FIG. 4 are watched, the pixels aij's satisfy the half tone conditions (D11)-(D13) in the following cases: any one of the pixels a00, a01, a10, and a11 satisfies the condition of THa1<aij≤THa3 (Step S6: Y); all of the pixels a00, a01, a10, and all satisfy aij≤THa1 (Step S7: Y); and all of the pixels a00, a01, a10, and all satisfy aij>THa3 (Step S8: Y). Consequently, the image compression conversion section 1 advances the processing to the half tone condition processing (Step S9).

On the other hand, even all of the half tone conditions (D11)-(D13) are not satisfied (Step S6: N; Step S7: N; Step S8: N), that is, in the case where the pixels aij's satisfying the condition of aij≤THa1 and the pixels aij's satisfying the condition of aij>THa3 are mixed among the pixels a00, a01, a10, and all in the example mentioned above, then the image compression conversion section 1 consider the pixels aij's to satisfy the high resolution condition (B1) to advance the processing to high resolution condition processing of performing quantization according to a high resolution region (Step S10).

Figure 6:
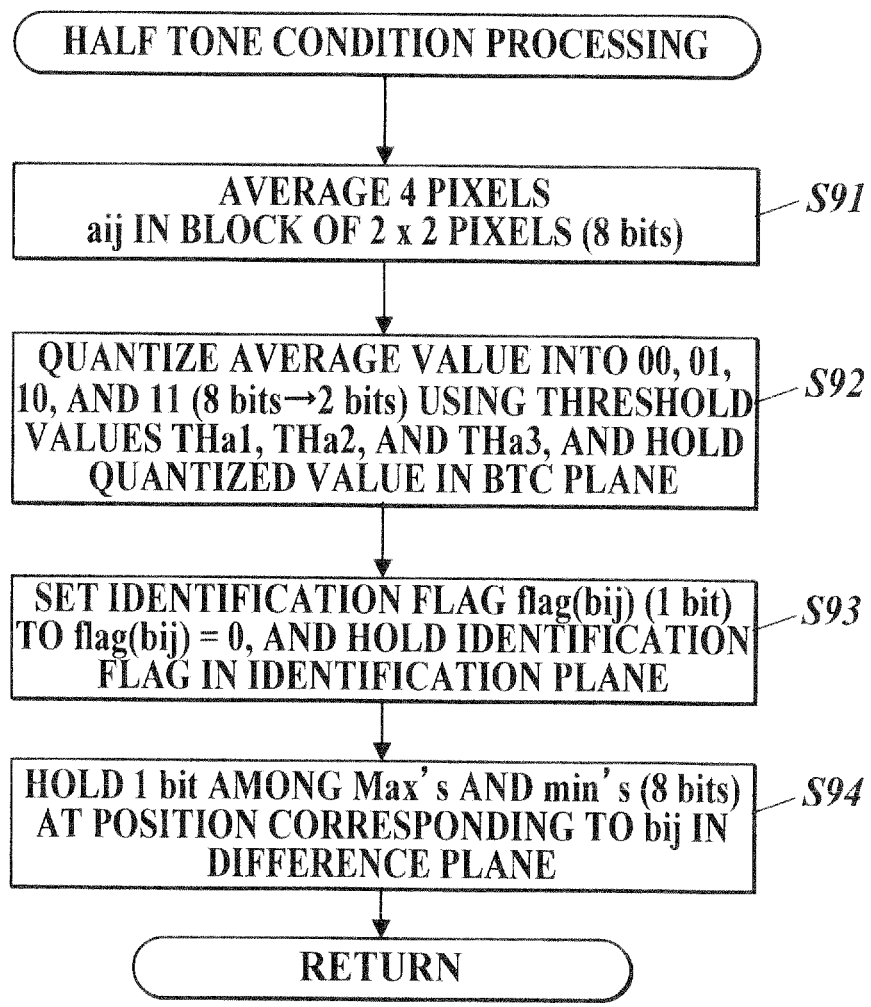
FIG. 6 is a flow chart showing half tone condition processing.

The half tone condition processing will be described with reference to FIG. 6.

The image compression conversion section 1 performs the quantization by the BTC system to the pixels aij's of the 2×2 pixels satisfying the half tone conditions. First, the image compression conversion section 1 calculates an average value avr(bij) obtained by averaging the data values aij's of 2×2 pixels as shown in FIG. 6 (Step S91). In case of the example of the pixels a00, a01, a10, and all, the average value avr(b00) is avr(b00)=¼(a00+a01+a10+a11). Next, the image compression conversion section 1 quantizes the average value avr(bij) of 8 bits to a data value BTC(bij) of 2 bits of 00, 01, 10, 11 with the use of threshold values THa1, THa2, and THa3. The image compression conversion section 1 holds the quantized data value BTC(bij) in the BTC plane (Step S92).

The image compression conversion section 1 performs the quantization in conformity to the following conditions:

$BTC(bij)=00$ when min≤avr(bij)<THa1;

$BTC(bij)=01$ when THa1≤avr(bij)<THa2;

$BTC(bij)=10$ when THa2≤avr(bij)<THa3; and $BTC(bij)=11$ when THa3≤avr(bij)≤Max.

Figure 7:
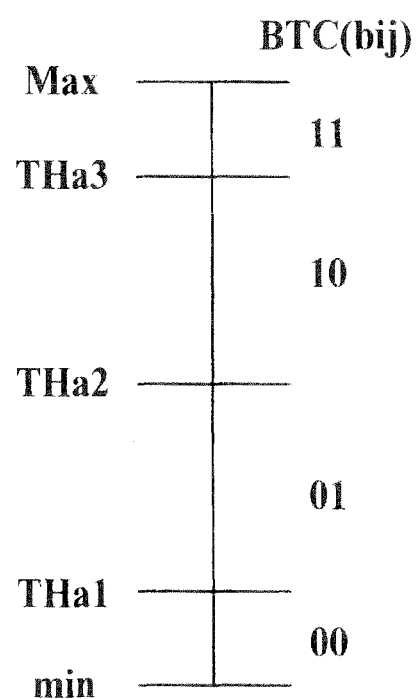
FIG. 7 is a diagram showing a quantization condition to be applied to a half tone region.

That is, as shown in FIG. 7, the image compression conversion section 1 quantizes the average value avr(bij) into any one of 4 data values on the basis of the node density to which the average value avr(bij) belongs among the density ranges determined by the maximum value Max, the minimum value min, and the threshold values THa1-THa3 by the BTC system. The quantized data ETC(bij) of 2 bits becomes the data value of one pixel bij of the compressed image. Incidentally, in the case where the minimum value min is equal to the maximum value Max (i.e. min=Max) and the density range between the minimum value min and the maximum value Max is 0, the quantized data ETC(bij)=00.

Moreover, after the averaging, the image compression conversion section 1 performs resolution conversion together with the quantization by performing the quantization.

Next, the image compression conversion section 1 sets the data value of the identification flag flag(bij) of the pixel bij of the compressed image corresponding to the pixels aij's of the 2×2 pixels of the original image to flag(bij)=0. Then, the image compression conversion section 1 holds the data value flag(bij) at the position corresponding to the pixel bij in the identification plane (see FIG. 5) (Step S93). Next, the image compression conversion section 1 holds the data value of 1 bit at the bit position corresponding to the pixel bij among the data values of the maximum value Max and the minimum value min at a bit position corresponding to the pixel bij in the difference plane (see FIG. 5) (Step S94).

For example, as for the pixel b00, the image compression conversion section 1 holds a data value 0 at the position of data value flag(b00) in the identification plane, and holds the data value at a seventh bit of the minimum value min at a position corresponding to the pixel b00 in the difference plane.

When the processing mentioned above ends, the image compression conversion section 1 advances the processing to Step S11 of FIG. 3.

Next, high resolution condition processing will be described with reference to FIG. 8.

In the high resolution condition processing, the image compression conversion section 1 produces a density pattern with the use of data values aij's of 2×2 pixels, and performs quantization according to the produced density pattern.

Figure 8:
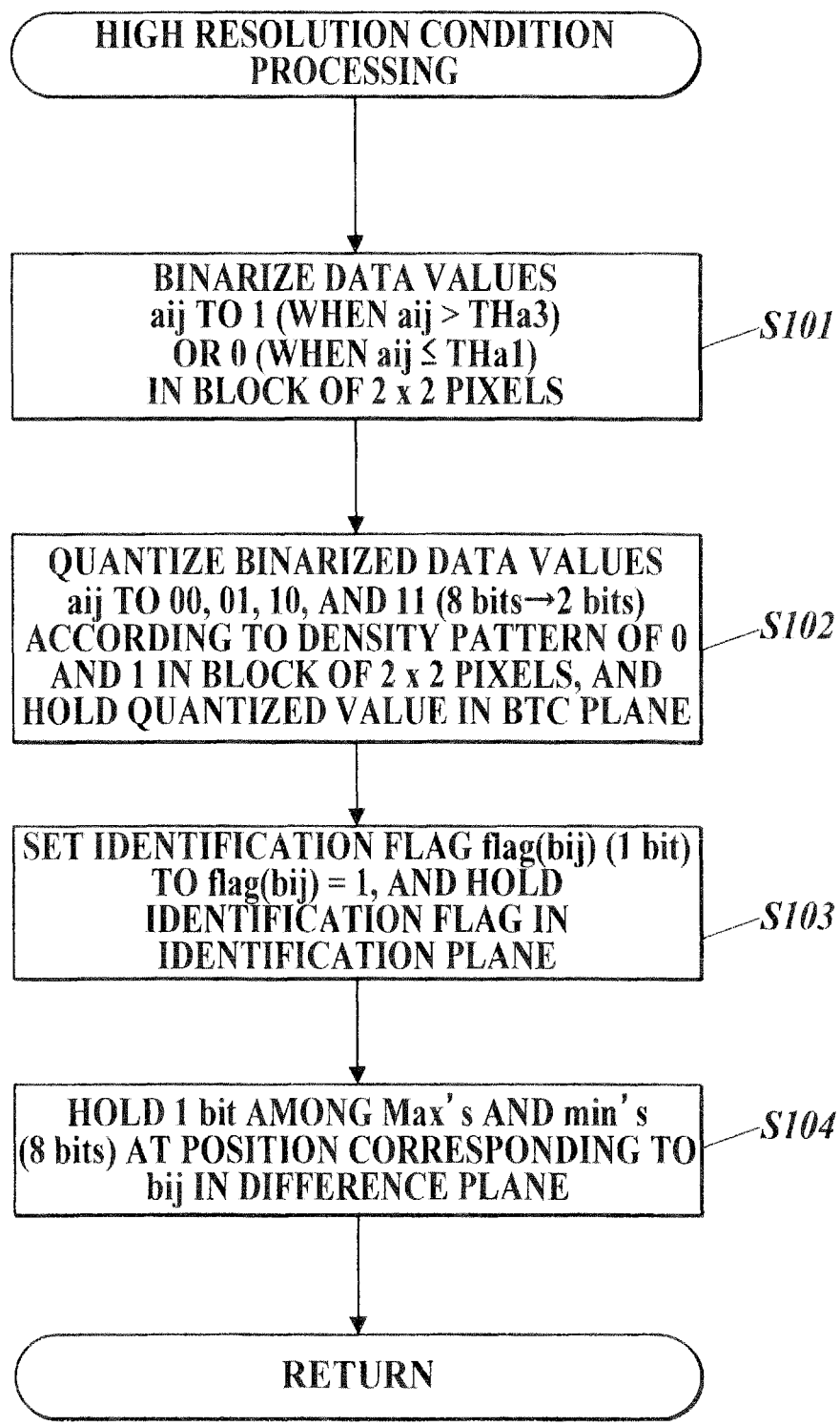
FIG. 8 is a flow chart showing high resolution condition processing.

As shown in FIG. 8, the image compression conversion section 1 binarizes the data values aij's of 2×2 pixels satisfying the high resolution condition to the values of 0 and 1 in conformity with the following conditions to produce a density pattern (Step S101).

$aij=1$ when $aij>THa3$ $aij=0$ when $aij \le THa1$

If the data values aij's satisfy the high resolution condition, the pixel having the data value aij=1 is in the neighborhood of the maximum value Max, and the pixel having the data value aij=0 is in the neighborhood of the minimum value min. Consequently, a pattern produced by setting binarized data of 0 and 1 at the position of each pixel becomes a density pattern showing density changes in a region of the pixels aij's of the 2×2 pixels.

Next, the image compression conversion section 1 quantizes the binarized data into data values BTC(bij)'s of 4 2 bits of 00, 01, 10, and 11 by means of the produced density pattern (Step S102). To put it concretely, the image compression conversion section 1 assigns the data values of 00, 01, 10, and 11 after quantization to each density pattern beforehand, and quantizes 2×2 pixels by converting the data values aij's of the 2×2 pixels into the data value corresponding to the density pattern produced concerning the data values aij's.

The example of classifying density patterns into 4 groups of H0-H3 and assigning data values 00, 01, 10, and 11 after quantization to each group as shown in FIG. 9 will be described here.

As shown in FIG. 3, the group of the density pattern H0 is the case of including only one data value aij=1 among the data values aij's of the 2×2 pixels. In this case, the pixels aij's are quantized to the data value ETC(bij)=00.

Moreover, the groups of the density patterns H1 and H2 are patterns each including 2 pixels having the data value aij=1, and the density patterns H1 and H2 are classified on the basis of the positions of the pixels having the data value aij=1 as shown in FIG. 9. If the data values aij's fit the density pattern H1, the data values aij's are quantized to the data value ETC(bij)=01; if the data values aij's fit the density pattern H2, the data values aij's are quantized to the data value ETC(bij)=10.

The group of the density pattern H3 are patterns including 3 pixels having the data value aij=1, and the data values aij's of the pattern are quantized to the data value ETC(bij)=11.

At the time of decoding, a density pattern is predicted from the data value ETC(bij) after quantization. Even is the prediction is mistaken, the pixels aij's can be expressed in the same density in a small region of 2×2 pixels by performing the quantization to make the density patterns having the same densities of 2×2 pixels (having the same numbers of 0 and 1 included in the density patterns) belong to the same group as described above. Consequently, the advantage of making it difficult can be obtained that errors visually appear as image quality deteriorations even if the errors are caused.

Incidentally, the density patterns may be classified into groups according to the arranged positions of 0 and 1 in the density patterns or the like, and data values after quantization may be assigned to each group classified as mentioned above.

After the image compression conversion section 1 has performed the quantization as mentioned above, the image compression conversion section 1 sets the data value of the identification flag flag(bij) of the pixel bij corresponding to the pixels aij's of the 2×2 pixels to flag(bij)=1, and holds the set flag(bij) in the identification plane shown in FIG. 5 (Step S103). Moreover, the image compression conversion section 1 holds the data value of 1 bit at the bit position corresponding to the pixel bij in the difference plane shown in FIG. 5 among the data values of 8 bits of the maximum values Max's and minimum values min's (Step S104).

When the image compression conversion section 1 has ended the processing described above, the image compression conversion section 1 advances the processing to Step S11 of FIG. 3.

The description is continued from the processing at Step S11 of FIG. 3.

At Step S11, the image compression conversion section 1 outputs a compressed image (600 dpi, 4 bits) having data values bij's of 4×4 pixels, which the image compression conversion section 1 has obtained through the half tone condition processing or the high resolution condition processing, to the image memory 16.

Next, the image compression conversion section 1 judges whether the image compression conversion section 1 has ended the half tone condition processing or the high resolution condition processing to all of the pixels aij's in the block of 8×8 pixels of the original image or not (Step S12). If the image compression conversion section 1 is still on the way of the processing (Step S12: N), then the image compression conversion section 1 returns the processing to Step S5, and the image compression conversion section 1 repeats the processing at Steps S1-S12 to the pixels aij's of the 2×2 pixels which the image compression conversion section 1 has not processed yet in the block of the 8×8 pixels.

On the other hand, if the image compression conversion section 1 has ended the processing to all of the pixels aij's in the block of the 8×8 pixels (Step S12: Y), the image compression conversion section 1 judges whether the image compression conversion section 1 has ended the processing to the end of the original image or not (Step S13). If the image compression conversion section 1 has not ended the processing (Step S13: N), then the image compression conversion section 1 returns the processing to that at Step S1, find the image compression conversion section 1 repeats the processing at Steps S1-S13 to the pixels aij's in the other unprocessed blocks of 8×8 pixels in the original image.

Then, when the image compression conversion section 1 has ended the processing to the end of the original image (Step S13: Y), the image compression conversion section 1 ends the present processing.

<Expansion Processing>

Next, expansion processing by the image expansion conversion section 2 will be described with reference to FIG. 10.

Figure 11:
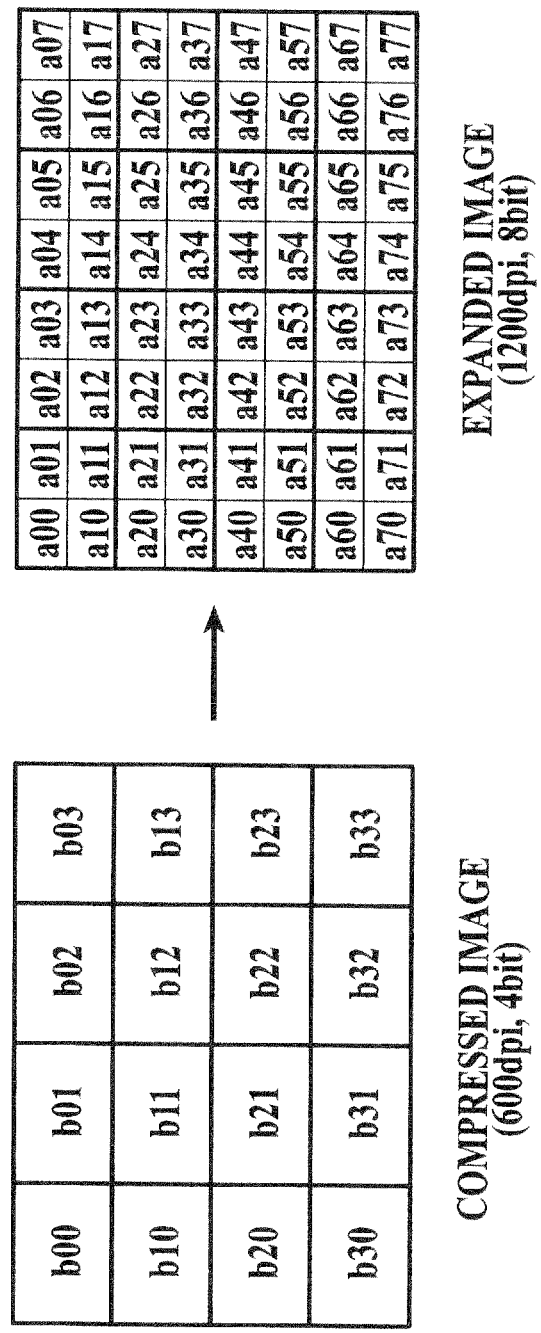
FIG. 11 is the compressed image and an expanded image before and after the expansion processing.

The image expansion conversion section 2 decodes a compressed image input from the image memory 16 to perform expansion by converting the data including 4 bits per pixel into the data including 8 bits per pixel as shown in FIG. 11. The image expansion conversion section 2 performs the expansion processing by the block of 4×4 pixels (bij's) corresponding to the block of 8×8 pixels (aij's), which is the processing unit at the time of compression. Moreover, the image expansion conversion section 2 performs the resolution conversion from 600 dpi to 1200 dpi at the time of decoding.

Figure 10:
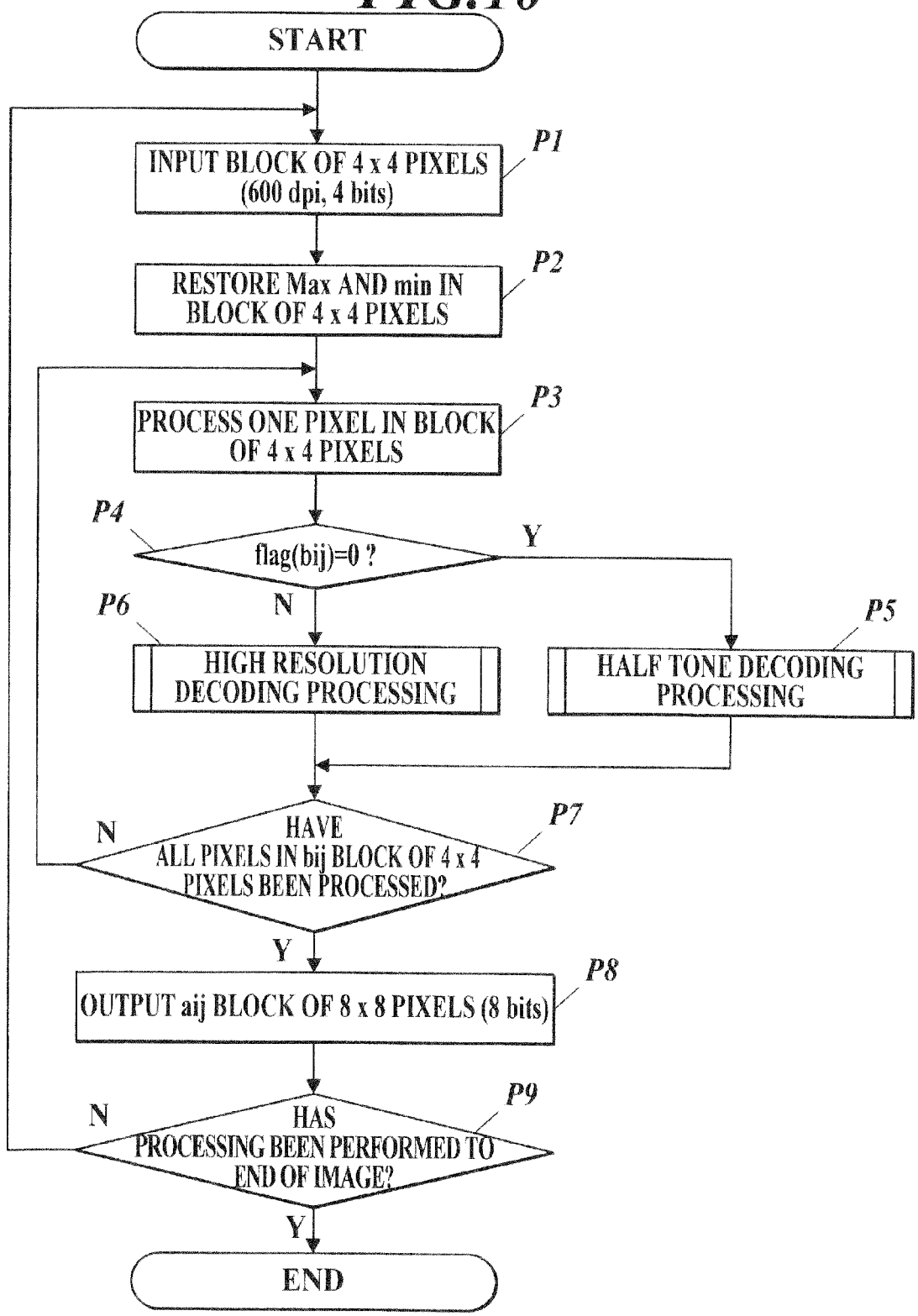
FIG. 10 is a flow chart showing the expansion processing.

As shown in FIG. 10, when the image expansion conversion section 2 inputs a compressed image of the processing unit of the pixels bij's of 4×4 pixels first (Step P1), the image expansion conversion section 2 obtains the maximum value Max(k) and the minimum value min(k) from the difference plane of the compressed image, and restores the data of the maximum value Max and the minimum value min by arranging them in the order of bits (Step P2). Next, in order to perform the decoding of the original image every pixel, the image expansion conversion section 2 watches 1 pixel bij in the processing region of the 4×4 pixels (Step P3).

The image expansion conversion section 2 obtains the identification flag flag(bij) from the identification plane set to the pixel bij, the watching pixel (pixel to be processed). In the case of flag (bij)=0 (Step P4: Y), the image expansion conversion section 2 executes half tone decoding processing (Step P5). On the other hand, in the case of flag(bij)=1 (Step P4: N), the image expansion conversion section 2 executes high resolution decoding processing (Step P6).

The half tone decoding processing will be described with reference to FIG. 12 first.

Figure 12:
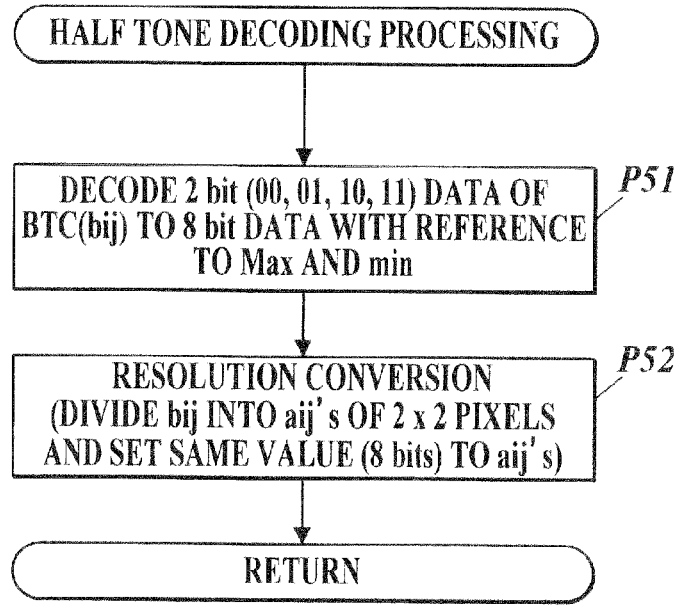
FIG. 12 is a flow chart showing half tone decoding processing.
Figure 13:
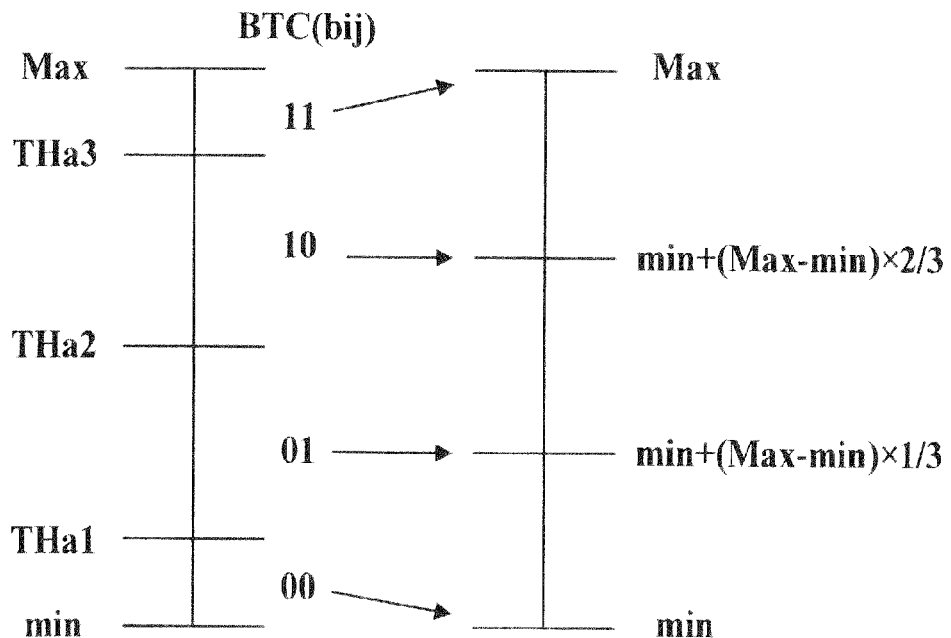
FIG. 13 is a diagram showing decoding condition applied to the half tone region in the expansion processing.

As shown in FIG. 12, the image expansion conversion section 2 decodes quantized data ETC(bij) of 2 bits in conformity with the ETC system with the use of the restored data of the maximum value Max and the minimum value min to expand the quantized data ETC(bij) to the data of 8 bits (Step P51). FIG. 13 is a diagram showing the relation between the quantized data ETC(bij) and decoded data. At the time of decoding, the image expansion conversion section 2 divides 1 pixel bij into pixels aij's of 2×2 pixels to perform resolution conversion, and assigns the data of 8 bits obtained by the expansion to each of the pixels aij's. That is, all the data values of the pixels aij's of the 2×2 pixels after the decoding become the same (Step P52).

For example, in case of performing the resolution conversion of 1 pixel b00 into 4 pixels a00, a01, a10, and a11, the image expansion conversion section 2 performs the expansion in conformity to the following conditions:

$a00=a01=a10=a11$ min when $BTC(b00)=00$;

$a00=a01=a10=a11=\min+(\text{Max}-\min)\times \frac{1}{3}$ when $BTC(b00)=01$;

$a00=a01=a10=a11=\min+(\text{Max}-\min)\times \frac{2}{3}$ when $BTC(b00)=10$; and $a00=a01=a10=a11=\text{Max}$ when $BTC(b00)=11$.

That is, as shown in FIG. 13, the quantized data BTC(bij) is decoded to the data values obtained by dividing the density range determined by the maximum value Max and the minimum value min into 3 equal pieces.

After the decoding, the image expansion conversion section 2 advances the processing to that at Step P7 of FIG. 10.

Next, the high resolution decoding processing will be described with reference to FIGS. 14 and 15.

As to the high resolution region, the image expansion conversion section 2 performs quantization with the use of a density pattern composed of 1 and 0. Since the image compression conversion section 1 classifies every plurality of density patterns into groups and assigns 4 quantized data values ETC(bij)'s (00, 01, 10, and 11) to the groups at the time of quantization, several density patterns are conceivable according to the data values BTC(bij)'s at the decoding of the quantized data values BTC(bij)'s to the original data of 8 bits as shown in FIG. 16. In the high resolution decoding processing, the image expansion conversion section 2 performs decoding while predicting the density pattern of the original image.

The image expansion conversion section 2 performs the prediction of the density pattern with the use of templates.

FIG. 17 is a diagram showing the relations between the templates to be used at the time of BTC(bij)=00 and the density patterns to be predicted with the use of the templates. An identification number (a numeral located at the upper left position of the template) is given to each template.

A C determined on each template indicates that the image expansion conversion section 2 judges the coincidence with the template in the case where the pixel situated at the position C satisfies the half tone conditions and the density difference $|C_{den}-\text{bij}_{Max}|$ between the pixel at the position C and the watching pixel bij satisfies the condition of $|C_{den}-\text{bij}_{Max}|<T_c$. The $C_{den}$ denotes the value when the image expansion conversion section 2 decodes the quantized data (2 bits) situated at the position C to the data value of 8 bits in conformity with the condition shown in FIG. 13. That is, if the quantized data of the pixel at the position C is BTC(bij)=00, then $C_{den}$=min; if BTC (bij)=01, then $C_{den}=\min+(\text{Max}-\min)\times\frac{1}{3}$; if BTC (Bij)= 10, then $C_{den}=\min+(\text{Max}-\min)\times\frac{2}{3}$; if BTC(bij)=11, then $C_{den}$=Max. The $\text{bij}_{Max}$ indicates the maximum density value Max in the processing region of the 4×4 pixels to which the watching pixel bij belongs.

Moreover, an M determined on each template indicates that the image expansion conversion section 2 judges the coincidence with the template in the case where the pixel situated at the position M satisfies the high resolution condition and the density difference $|M_{Max}-\text{bij}_{Max}|$ between the pixel at the position M and the watching pixel bij satisfies the condition of $|M_{Max}-\text{bij}_{Max}|<T_M$. The $M_{Max}$ indicates the maximum density value Max in the processing region of the 4×4 pixels to which the pixel at the position M belongs. If the pixel at the position M and the watching pixel bij belong to the same processing region, then $M_{Max}$=bij$_{Max}$=Max. Consequently, the density difference between the maximum density value $M_{Max}$ and the maximum density value bij$_{Max}$ is 0.

Incidentally, $T_C$ and $T_M$ indicate threshold values for judging whether a density difference is small or not, and can be suitably set. For example, the threshold values $T_C$ and $T_M$ can be set to: $T_C$=30 and $T_M$=35, and the like. The threshold values $T_C$ and $T_M$ may be set to the different values from each other, or may be set to the same value. By the comparison with the threshold values $T_C$, and $T_M$, the image expansion conversion section 2 predicts the density pattern having a small density difference, that is, the density pattern making the pixel at the position C or M and the watching pixel bij have the densities of comparable levels.

Figure 18:
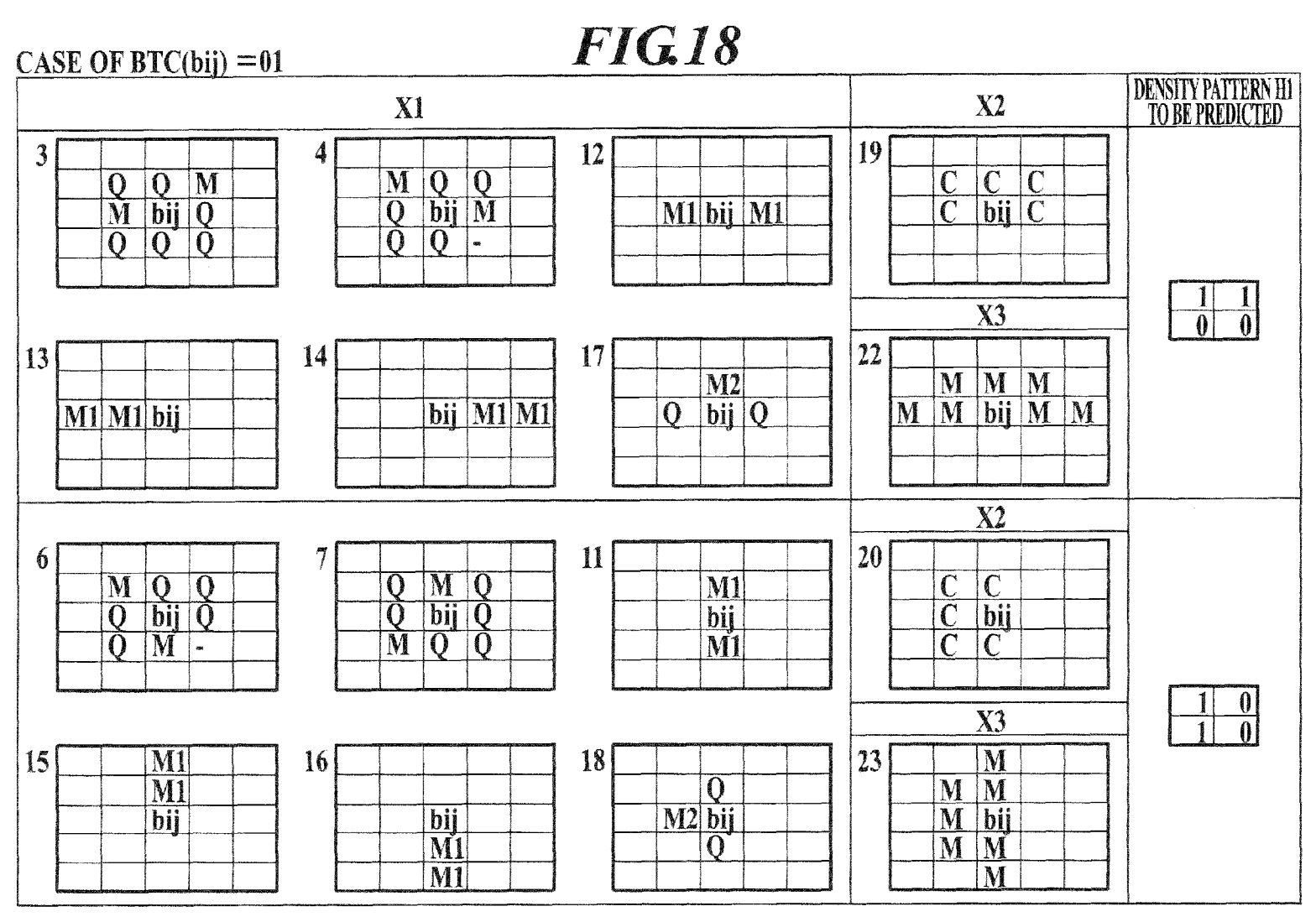
Figure 21:
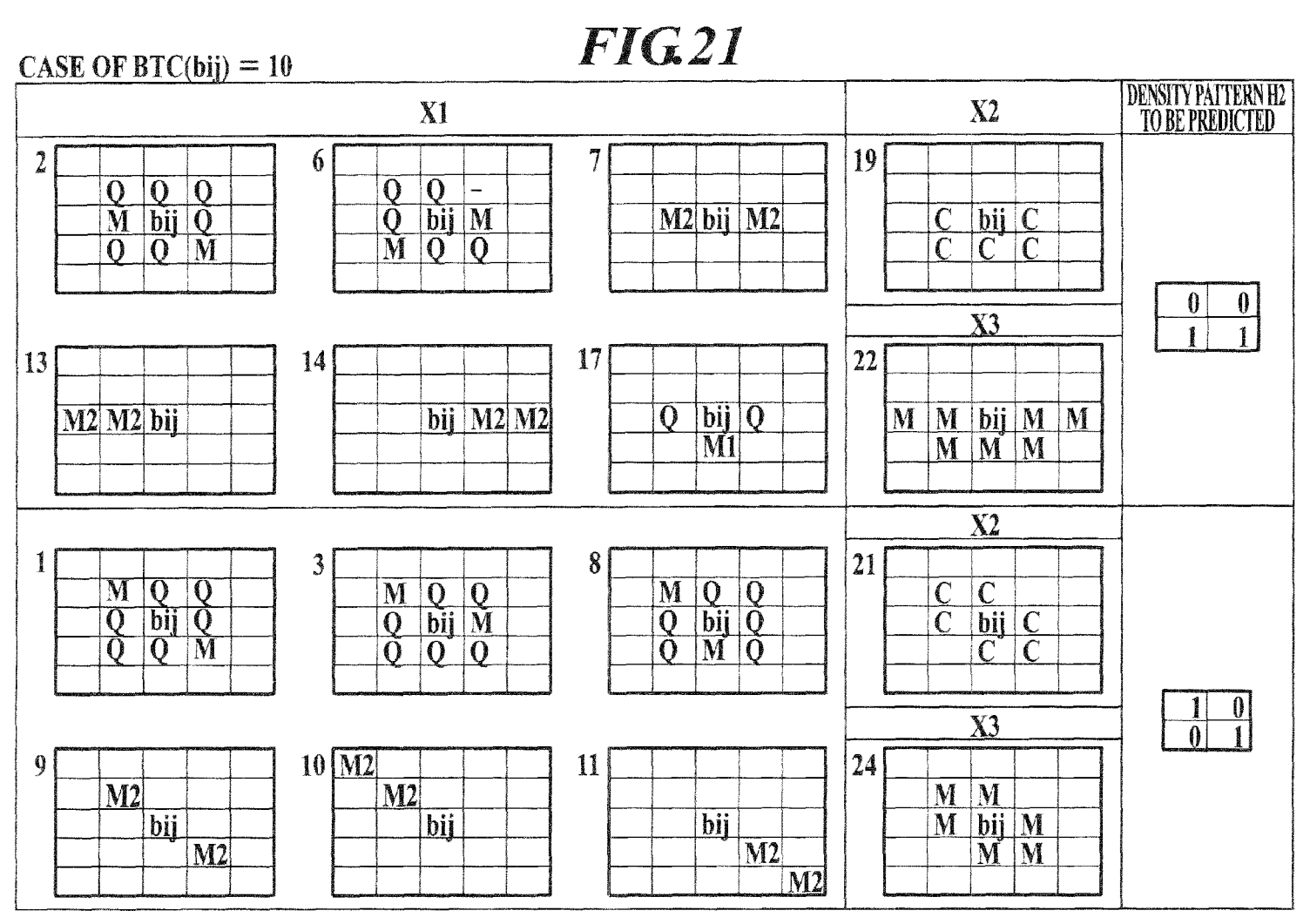

Similarly, FIGS. 18 and 19 are diagrams showing the relations between the templates to be used for the case of BTC (bij)=01 and the density patterns to be predicted; FIGS. 20 and 21 are diagrams showing the relations between the templates to be used for the case of BTC(bij)=10 and the density patterns; FIG. 22 is a diagram showing the relations between the templates to be used, for the case of BTC(bij)=11 and the density patterns.

In FIGS. 18-22, an M1 indicates that the image expansion conversion section 2 judges the coincidence with the template in the case where the pixel situated at the position M1 satisfies the condition of M and fits the density pattern H1. That is, it becomes the condition that the pixel at the position M1 is BTC(bij)=01.

An M2 indicates that the image expansion conversion section 2 judges the coincidence with the template in the case where the pixel situated at the position M2 satisfies the condition of M and fits the density pattern H2. That is, it becomes the condition that the pixel at the position M2 is BTC(bij)=10.

A Q indicates that the image expansion conversion section 2 judges the coincidence with the template in the case where the pixel situated at the position Q does not satisfy any conditions of C, M, M1, and M2.

Each template is classified into three groups of X1, X2, and X3. The classification is performed in order to perform the prediction at three stages.

As to the templates belonging to the X1 group, the condition for judging the coincidence to the templates is to satisfy all of the conditions of C, M, and the like, which are defined in the templates. On the other hand, as to the templates belonging to the X2 and X3 groups, the coincidence with the templates are judged by the results of evaluations performed about the degree of the satisfaction of the coincidence conditions not by the existence of the satisfaction of all the coincidence conditions. For example, as to the X2 group, collation is once performed concerning all the templates in the X2 group, and the numbers of pixels satisfying the coincidence conditions of C, M, and the like are counted with regard to each template. Then, the counted values are used as the evaluation values. Then, the judgment of coincidence is performed to the template to which the obtained evaluation value becomes the maximum.

These templates are used in order to predict the density pattern of a watching pixel bij on the basis of the shape, the thin line structure, and the like, of an edge included in an original image. Because the edge shape can be specified from the density pattern of the peripheral pixels of the watching pixel bij, the templates define the conditions of the peripheral pixels when edge shapes are formed as the conditions of the C, M, and the like described above.

In particular, the templates of the X1 group are designed in order that the density patterns in the case where the watching pixel bij is a pixel of a thin line structure needing to keep high resolution can be predicted, and the templates of the X2 and X3 groups are designed in order that the edge shapes and the like can be widely predicted as looser conditions than those of the templates in the X1 group.

For example, as shown in FIG. 23A, if the image of an oblique line of a 1-dot width is included in the pixels a00-a77 of an original image, then the 4 pixels of a44, a45, a54, and a55 satisfy the high resolution condition, and fit the density pattern H1. The pixel b22 of the compressed image corresponding to the 4 pixels must be quantized to be BTC(b22)= 01. At the time of decoding, the image expansion conversion section 2 can thereupon predict that the pixel b22 has the 1-dot width, and that dots are in a row so as to be coupled to the dots formed at the peripheral pixels b13 and b31 (at the upper right and the lower left, respectively, of the watching pixel b22), and further that the densities of those dots are comparable levels, on the basis of the density patterns of the peripheral pixels b13 and b31. Accordingly, in order to predict such density patterns, the necessary thing is to prepare a template 8 defining the conditions of M1's in the peripheral pixels as shown in FIG. 23A. The template 8 is the one at the time of BTC(bij)=01 shown in FIG. 19.

Figure 23B:
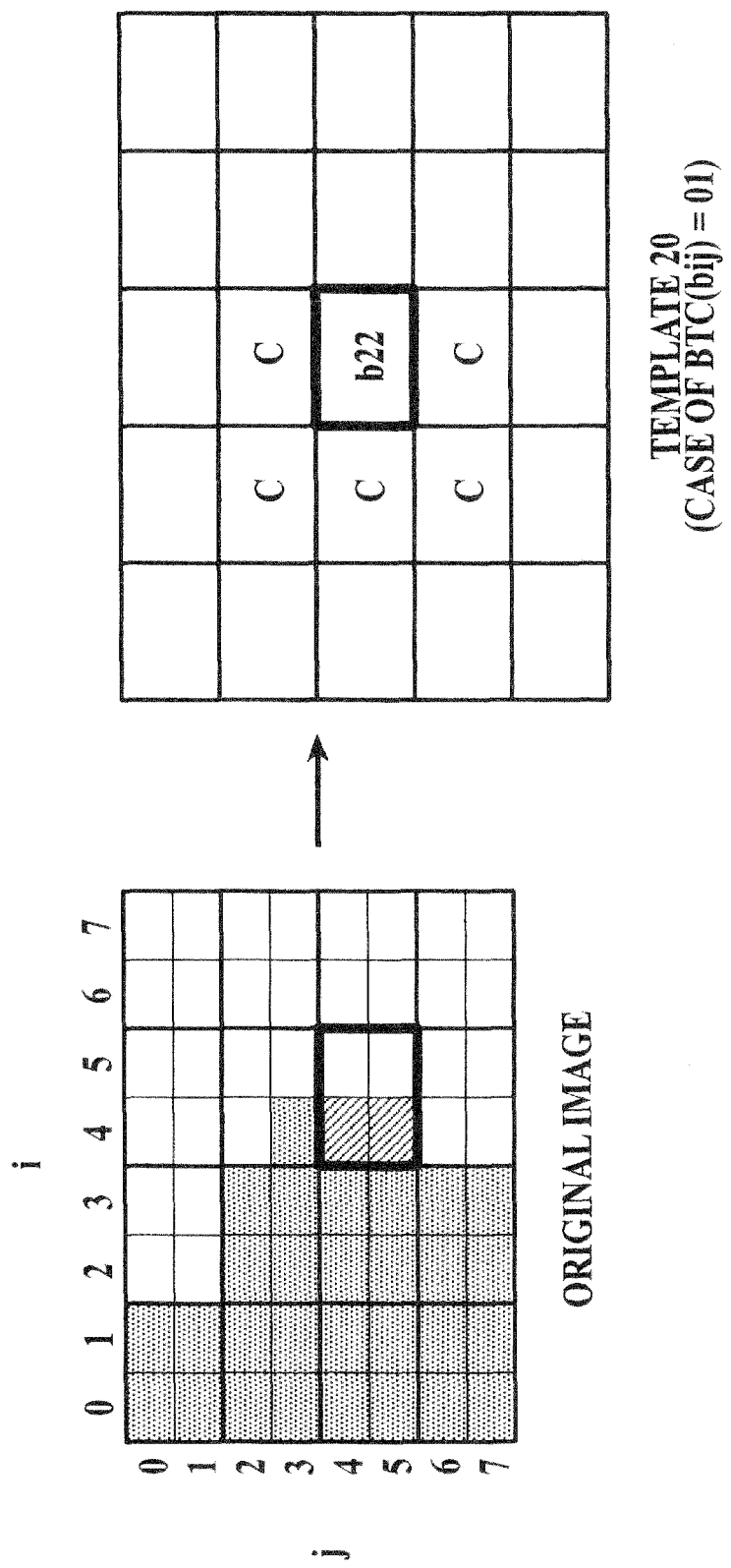
FIG. 23B is a diagram showing an original image and a template to be used for a prediction.

Moreover, as shown in FIG. 23B, in case of an original image including the edge of an image having a certain density, the pixels a44, a45, a54, and a55 constituting the edge part fit the density pattern H1. In order to predict a density pattern of this edge shape at the time of decoding, the necessary thing is to prepare a template 20 defining the conditions of C in the peripheral pixels of a pixel b22 in a compressed image corresponding to the pixels a44, a45, a54, and a55 as shown in FIG. 23B. The template 20 (the one at the time of BTC(bij)= 01 shown in FIG. 18) is the one belonging to the X2 group. Because the pixels (a24, a25, a34, and a35) corresponding to the pixels right above the watching pixel b22 satisfy the high resolution condition in the original image, the pixels (a24, a25, a34, and a35) result in not satisfying the condition of C right above the pixel b22 in the template 20, but the pixels (a22, a32, a23, and a33), (a42, a43, a52, and a53), and (a62, a3636, a72, and a73) corresponding to the 3 pixels on the left side of the pixel b22 result in satisfying the condition of C. Consequently, the evaluation value of the template 20 becomes higher, and the possibility of the density pattern to be judged to coincide with the template 20 must become larger.

Incidentally, in order to perform a weighting evaluation, weighting coefficients may be set in the templates of the X2 find X3 groups. For example, in the case of the original image shown in FIG. 23B, if all of the 3 pixels situated on the left side of the watching pixel b22 satisfy the condition of C, then the possibility that the watching pixel b22 has the density pattern in which 2 pixels on the left side among the 2×2 pixels have the value of 1 is high. Accordingly, for example, a weighting coefficient of 2 times is set beforehand to the coincidence condition C set to the 3 pixels situated on the left side of the watching pixel b22 of the template 20. If the pixels at the 3 pixel positions satisfy the condition of C, then the evaluation value may be set as a value multiplied by the weighting coefficient. Thereby, the concordance rate with the template can be adjusted.

Incidentally, the templates shown in FIGS. 17-22 are exemplifications. The templates may be suitably designed according to the edge shapes conceivable to be included in an original image.

Figure 14:
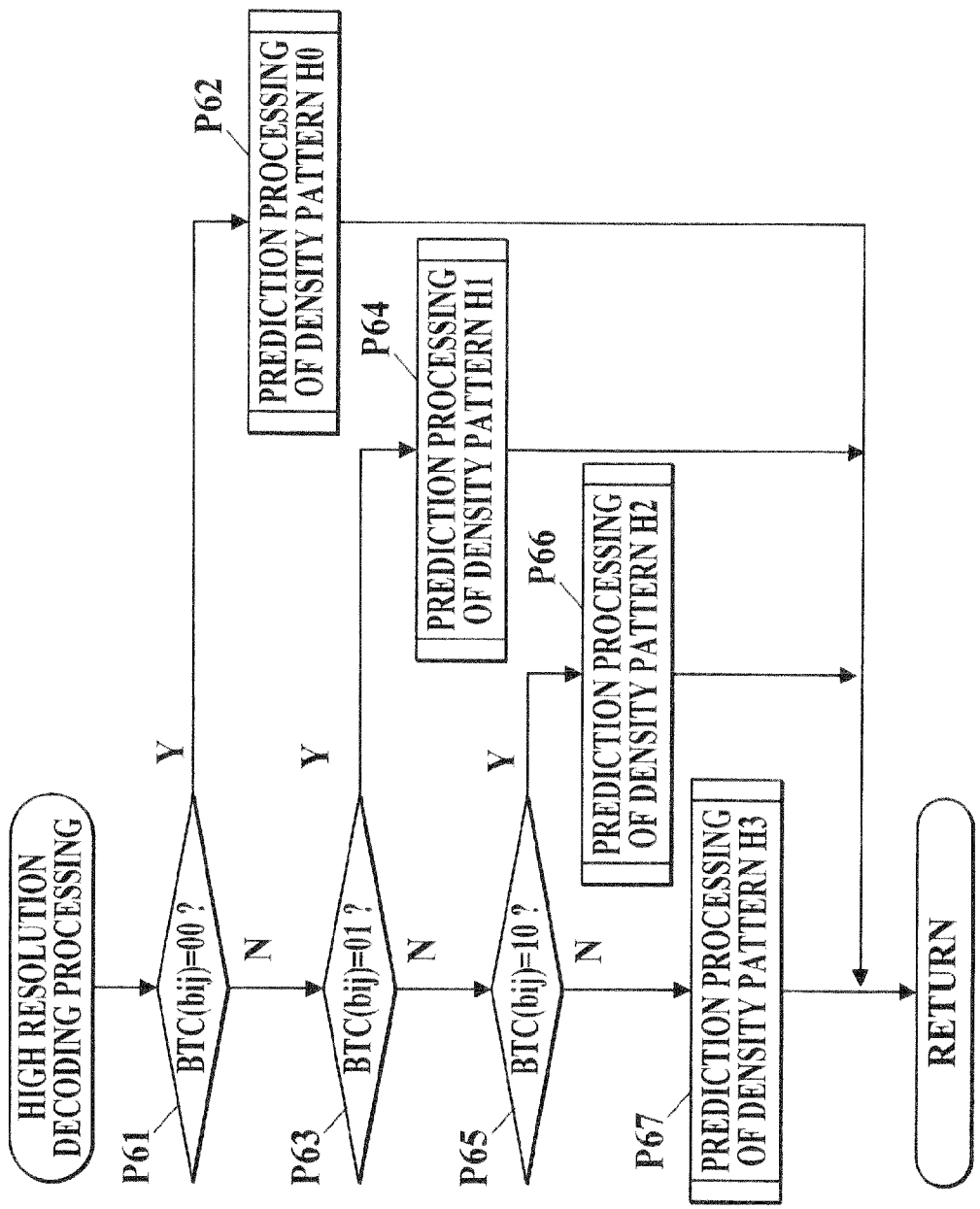
FIG. 14 is a flow chart showing high resolution decoding processing.

As the flow of processing, as shown in FIG. 14, the image expansion conversion section 2 refers to quantized data BTC (bij). If BTC(bij)=00 (Step P61: Y), the image expansion conversion, section 2 advances the processing to the prediction processing of the density pattern H0 (Step P62). Similarly, if BTC(bij)=01 (Step P61: N, P63: Y), the image expansion conversion section 2 advances the processing to the prediction processing of the density pattern H1 (Step P64), and if BTC(bij)=10 (Step P61: N, P63: N, P65: Y), the image expansion conversion section 2 advances the processing to the prediction processing of the density pattern H2 (Step P66). Moreover, if BTC(bij)=11 (Step P61: N, P63: N, P65: N), the image expansion conversion section 2 advances the processing to the prediction processing of the density pattern H3 (Step P67).

The processing content of the prediction processing of the density patterns H0-H3 is basically the same and only different from each other in the templates to be used. Consequently, the prediction processing of the density pattern H0 is described as a representative of those of the density patterns H0-H3 with reference to FIG. 15 here.

As shown in FIG. 15, the image expansion conversion section 2 performs the collation with one of the templates of the X1 group centering around the watching pixel bij. If the image expansion conversion section 2 judges the coincidence with the collated template (Step P621: Y), then the image expansion conversion section 2 decodes the watching pixel bij according to the density pattern to be predicted which is defined by the coinciding template, and outputs the decoded image, that is, the image composed of the pixels aij of 2×2 pixels (Step P628). The information of the predicted density pattern is output to the edge classification section 3.

The image expansion conversion section 2 performs the decoding by replacing the data value of 1 in the density pattern to be predicted with the maximum value Max and the data value of 0 with the minimum value min, and by outputting the replaced data values. Thereby, the image expansion conversion section 2 performs resolution conversion together with the decoding. At the time of patterning to the density pattern in the compression processing, the image expansion conversion section 2 replaces a data value in the neighborhood of the maximum value Max with 1, and the data value in the neighborhood of the minimum value min with 0. Consequently, it is conceivable that the pixels aij can be restored to be the densities having comparable levels even if the image expansion conversion section 2 replaces the pixel aij having the data value of 1 with the maximum value Max and the pixel aij having the data value of 0 with the minimum value min.

For example, if BTC(bij)=00 and a coincidence with the template 1 is caused, then the density pattern to be predicted is the one in which the pixel located in the upper left portion has the data value of 1 and the other pixels have the data value of 0 as shown in FIG. 16. The image expansion conversion section 2 outputs an image composed of pixels aij of 2×2 pixels produced by replacing the value of 1 with the maximum value Max (8 bits) and the values of 0 with the minimum values of 0 (8 bits) in this density pattern as a decoded image (1200 dpi, 8 bits).

In the case of not coinciding with the collated template (Step P621: N), the image expansion conversion section 2 judges whether the collation with all of the templates in the X1 group has ended or not (Step P622). If the image expansion conversion section 2 has not ended the collation with all of the templates (Step P622: N), then the image expansion conversion section 2 returns the processing to that at Step P621, and the image expansion conversion section 2 repeats the collation with the other templates belonging to the same X1 group until the coincidence with any template in the X1 group can be obtained.

If the image expansion conversion section 2 has performed the collation with all of the templates in the X1 group and could not obtain any coincidence (Step P622: Y), then the image expansion conversion section 2 performs the collation with all of the templates belonging to the X2 group and calculates evaluation values (Step P623). Then, if an evaluation value among those calculated to every template has the maximum value exceeding 0 (Step P624: Y), the image expansion conversion section 2 judges the coincidence with the templates having maximum value equal to the evaluation value (Step P627). Then, the image expansion conversion section 2 performs the decoding of the watching pixel bij with the use of the density pattern to be predicted which is defined by the coinciding template, and outputs the decoded image aij (Step P628).

On the other hand, if no conditions defined by the templates in the X2 group are satisfied and the maximum value of the evaluation value is 0 (Step P624: N), then the image expansion conversion section 2 performs the collation with all of the templates belonging to the X3 group, and calculates evaluation values (Step P625). If the maximum value of the evaluation value of each of the templates exceeds 0 (Step P626: Y), then the image expansion conversion section 2 judges the coincidence with the template having the evaluation value of the maximum value (Step P627), and performs the decoding of the watching pixel bij with the use of the density pattern to be predicted which is defined by the coinciding template, and outputs the decoded image aij (Step P628).

If no conditions defined by the templates of the X3 group are satisfied and the maximum value of evaluation values are 0 (Step P626: N), then, it is conceivable that a pixel part having the data value of 1 forms the image of an isolated point in the pixels aij's of the 2×2 pixels. In this case, because it is difficult for the image expansion conversion section 2 to predict the density pattern even if the image expansion conversion section 2 refers to peripheral pixels, the image expansion conversion section 2 configures a decoded image using an averaged pattern and outputs the decoded image (Step P629). The averaged pattern is a pattern in which an average value is assigned to each pixel aij of 2×2 pixels as shown in FIG. 16.

For example, in the case of the density pattern H0, the number of the pixels having the data value of 1 is 1 in the pixels aij's of 2×2 pixels. That is, the pixels aij's of the density pattern H0 outputs the density value of the maximum value Max from the 4 pixels. Consequently, the averaged pattern becomes the one in which an average value ¼ Max is assigned to all of the pixels aij's of the 2×2 pixels. Similarly, because the pixels aij's of 2×2 pixels of the density patterns H1 and H2 output the density of the 2 maximum values Max's from the 4 pixels and the pixels aij's of the density pattern H3 output the density of the 3 maximum values Max's from the 4 pixels, the values of ½Max and ¾Max are assigned to the pixels aij's of the 2×2 pixels, respectively.

Outputting the image composed of the pixels aij of the 2×2 pixels decoded as mentioned above, the image expansion conversion section 2 advances the processing to that at Step S7 of FIG. 10.

At Step P7, the image expansion conversion section 2 judges whether the image expansion conversion section 2 has ended the processing of decoding and resolution conversion to all of the pixels bij's in the processing region of the 4×4 pixels of the compressed image or not (Step P7). In the case where the image expansion conversion section 2 is still on the way of the processing, the image expansion conversion section 2 returns the processing to Step P3 and repeats the processing at Steps P3-P7 to other 1 pixel bij in the processing region of the pixels bij's of the 4×4 pixels.

Then, when the image expansion conversion section 2 has ended the processing of the decoding and the resolution conversion to all of the pixels bij's of the 4×4 pixels in the processing region (Step P7: Y), the image expansion conversion section 2 outputs the image composed of the pixels aij's of 8×8 pixels output from each pixel bij in the processing region of the pixels bij's of the 4×4 pixels (Step P8). Next, the image expansion conversion section 2 judges whether the image expansion conversion section 2 has ended the processing to the end of the compressed image or not (Step P9). If the image expansion conversion section 2 has not ended the processing (Step P9: N), then the image expansion conversion section 2 returns the processing to that at Step P1 and repeats the processing at Steps P1-P9 to the next processing region of the pixels bij's of the 4×4 pixels of the compressed image. If the image expansion conversion section 2 has ended the processing to the end of the compressed image (Step P9: Y), then the image expansion conversion section 2 ends the present processing.

<Edge Classification Processing>

Figures 24, 25, 26:
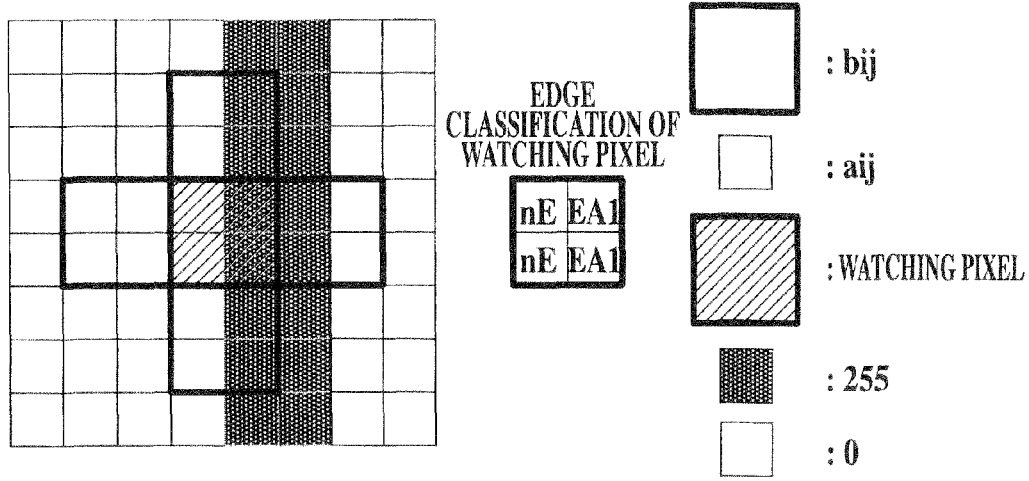
FIG. 24 is a table showing relations between the edge classifications and the edge signals.
FIG. 25 is a diagram showing a watching pixel and 8 peripheral pixels around the watching pixel, which are referred to at the time of the classification of an edge.
FIG. 26 is a diagram showing an edge pattern and an edge classification of watching pixels in the pattern.

The edge classification section 3 performs edge classification processing with the use of a compressed image which has been subjected to the compression processing and will be subjected to the expansion processing as described above. In the edge classification processing, the edge classification section 3 classifies the pixels constituting an edge into 4 types of a thin line of a 1-pixel width, a thin line of a 2-pixel width, an outer edge (pixels situated at the outermost contour of an object), and an inner edge (pixels adjoining the outer edge and being situated on the inner side of the object than the outer edge). Then, the edge classification section 3 outputs an edge signal of 3 bits showing the edge classification concerning each pixel of the compressed image. The relations between the edge classifications and the edge signals are shown in a table as can be seen in FIG. 24. In the edge classification processing, the edge classification section 3 detects an edge pattern included in an expanded image when a compressed image is expanded by the image expansion conversion section 2 with the use of the identification flag flag(bij) and the quantized data BTC(bij) included in the compressed image, and performs the edge classification according to the edge pattern.

The edge classification section 3 detects an edge pattern by judging whether the edge pattern satisfies the following conditions (1)-(10) defining various patterns of edges or not. The order of the conditions (1)-(10) is the descending order of the priorities of the edge patterns to be detected in conformity with the conditions (1)-(10). Consequently, the edge classification section 3 performs the judgment in the order of the conditions (1)-(10), and when the edge pattern to be judged satisfies any one of the conditions (1)-(10), the edge classification section 3 ends the processing of the edge classification at that time point.

To put it concretely, the edge classification section 3 watches the compressed image by the pixel, and judges whether the region of an expanded image corresponding to the watching pixel and 8 peripheral pixels fits the edge patterns defined by the following conditions (1)-(10) or not with the use of the identification flags flag(bij)'s and the quantized data BTC(bij) of the watching pixel and the 8 peripheral pixels. Then, if the region fits any of the edge patterns, the edge classification section 3 generates an edge signal concerning the pixels aij's (1200 dpi) of 2×2 pixels of an expanded image corresponding to the watching pixel bij (600 dpi), and outputs the generated edge signal.

In the following, a description will be given to the example of performing pattern detection and edge classification based on the conditions (1)-(10) concerning an watching pixel b22 and the peripheral pixels b11, b12, b13, b21, b23, b31, b32, and b33 of the watching pixel b22 shown in FIG. 25. Incidentally, in the following, Max(bij) and min(bij) denotes the maximum value Max and the minimum value min, respectively, in the processing region (the region of a processing unit of compression and expansion) of the 4×4 pixels to which the pixels bij's belong.

Incidentally, edge classification sometimes needs the information of a density pattern predicted by the image expansion conversion section 2 concerning the watching pixel. Because the information of the density pattern predicted concerning the region having a flag flag(bij)=1 is input from the image expansion conversion section 2 into the edge classification section 3, the edge classification section 3 uses the information of the density pattern in the edge classification.

Condition (1): Edge Pattern of a Thin Line (EA1) of a 2-Pixel Width

If all of the following conditions are satisfied concerning the watching pixel b22 and 4 peripheral pixels b21, b23, b12, and b32, situated on the left, right, top and bottom of the watching pixel b22, respectively, then the processing region fits the edge pattern of a thin line (EA1) of a 2-pixel width.

Watching pixel b22: flag(b22)=1.

4 peripheral pixels b21, b12, b23, and b32: the number of the peripheral pixels of a flag flag(bij)=0 must be 1 among the 4 peripheral pixels, and the peripheral pixels must satisfy the following i) or ii).

i) If the quantized data of the peripheral pixels is BTC(bij)=00, then the peripheral pixels must satisfy {Max(b22)−min(bij)}>Th1. That is, the minimum value min(bij) of the peripheral pixels must be smaller than the maximum value Max(b22) of the watching pixel b22 by an amount equal to or more than a threshold value Th1.

ii) If the quantized data of the peripheral pixel is BTC(bij)≠00, then the peripheral pixels must satisfy {Max(b22)−Max(bij)}>Th1. That is, the maximum value Max(bij) of the peripheral pixels must be smaller than the maximum value Max(b22) of the watching pixel b22 by an amount equal to or more than the threshold value Th1.

The threshold value Th1 is the one which is prepared beforehand in order to judge whether the density differences between the density of the watching pixel b22 and the densities of the peripheral, pixels b21, b12, b23, and b32, which are half tone regions, are those corresponding to an edge or not. That is, the edge classification section 3 judges the existence of an edge by means of the threshold value Th1.

Moreover, with regard to the peripheral pixels, when BTC(bij)≠00, the density differences are obtained with the use of the maximum value Max(bij) in place of decoded data values, which must be essentially used, according to quantized data values. The reason of the use of the maximum value Max(bij) is to simplify the processing. Because the necessary thing is to be able to detect an edge here, the edge classification section 3 performs the judgment of the existence of an edge by approximating the decoded data value to the maximum value Max(bij) when BTC(bij)≠00 with regard to the peripheral pixels, which are half tone regions. In the case of approximation to the maximum value Max(bij) as mentioned above, the density differences tend to be smaller, and consequently the setting is the one difficult to be detected as an edge.

When the condition (1) is satisfied, the edge classification section 3 judges the pixel aij the one constituting an edge. At the pixel aij, the value of a density pattern to be predicted from the watching pixel b22 by the image expansion conversion section 2 becomes 1. The pixel aij is one of the 2×2 pixels of the expanded image corresponding to the watching pixel b22.

The edge classification section 3 sets the edge classification of the edge to the thin line (EA1) of the 2-pixel width. Moreover, the edge classification section 3 judges the pixels aij's at which the values of the density pattern become 0 not an edge (nE). Then, the edge classification section 3 generates an edge signal concerning each pixel aij (1200 dpi) and output the generated edge signal.

A pattern as shown in FIG. 26 is given as an edge pattern example satisfying the condition (1). In FIG. 26, the identification flag of the watching pixel b22, which is a high resolution region, is flag(b22)=1. Moreover, only a peripheral pixel b21 among the peripheral pixels b21, b12, b23, and b32 is a half tone region, and the identification flag of the peripheral pixel b21 is flag(b21)=0. Furthermore, the quantized data of the peripheral pixel 21 is BTC(b21)=00. Because the minimum value min(b21)=0 and the maximum value Max(b22)=255, the maximum value Max(b22) and the minimum value min(b21) satisfy the relational expression {Max(b22)−min(b21)}>Th1. Consequently, the edge classification section 3 judges that the pattern fits the edge pattern of the thin line of the 2-pixel width. Moreover, the edge classification section 3 outputs an edge signal indicating that the edge classification of the pixel having a value of a density pattern of 1, which value is predicted from the watching pixel b22, is the thin line (EA1) of the 2-pixel width as shown in FIG. 26.

Condition (2): Edge Pattern of a Thin Line (EA0) of a 1-Pixel Width

If all of the following conditions are satisfied concerning the watching pixel b22 and 4 peripheral pixels b21, b23, b12, and b32, situated on the left, right, top and bottom of the watching pixel b22, respectively, the processing region fits the edge pattern of a thin line (EA0) of a 1-pixel width.

Watching pixel b22: flag(b22)=1.

4 peripheral pixels b21, b12, b23, and b32: all of the peripheral pixels having the identification flag of flag(bij)=0 among the 4 peripheral pixels must satisfy the following i) or ii).

i) If the quantized data of the peripheral pixels is BTC(bij)=00, then the peripheral pixels must satisfy {Max(b22)−min(bij)}>Th1. That is, the minimum value min(bij) of the peripheral pixels must be smaller than the maximum value Max(b22) of the watching pixel b22 by an amount equal to or more than the threshold value Th1.

ii) If the quantized data of the peripheral pixels is BTC(bij)≠00, then the peripheral pixels must satisfy {Max(b22)−Max(bij)}>Th1. That is, the maximum value Max(bij) of the peripheral pixels must be smaller than the maximum value Max(b22) of the watching pixel b22 by an amount equal to or more than the threshold value Th1.

When the condition (2) is satisfied, the edge classification section 3 judges the pixel aij the one constituting an edge. At the pixel aij, the value of a density pattern to be predicted from the watching pixel b22 becomes 1. The pixel aij is one of the 2×2 pixels of the expanded image corresponding to the watching pixel b22. The edge classification section 3 sets the edge classification to a thin line (EA0) of the 1-pixel width. Moreover, the edge classification section 3 judges the pixels aij's at which the values of the density pattern become 0 not an edge (nE). Then, the edge classification section 3 generates an edge signal concerning each pixel aij (1200 dpi) and outputs the generated edge signal.

Figure 27:
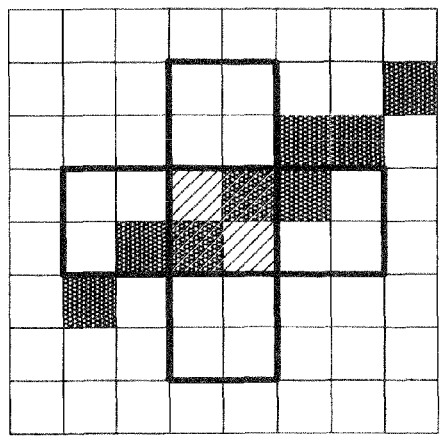
FIG. 27 is a diagram showing an edge pattern and an edge classification of watching pixels in the pattern.

A pattern as shown in FIG. 27 is given as an edge pattern example satisfying the condition (2). In FIG. 27, the identification flag of the watching pixel b22, which is a high resolution region, is flag(b22)=1. Moreover, the peripheral pixels b12 and b32 among the peripheral pixels b21, b12, b23, and b32 are half tone regions having the identification flag of flag(bij)=0. Furthermore, all of the quantized data of the peripheral pixel 12 and b32 are BTC(bij)=00. Because the minimum value min(bij)=0 and the maximum value Max(b22)=255, the maximum value Max(b22) and the minimum value min(b21) satisfies the relational expression {Max(b22)−min(bij)}>Th1. Consequently, the edge classification section 3 judges that the processing region fits the edge pattern of the thin line of the 1-pixel width. Moreover, the edge classification section 3 outputs an edge signal indicating that the edge classification of the pixel aij having a value of a density pattern of 1, which value is predicted from the watching pixel b22, is the thin line (EA0) of the 1-pixel width as shown in FIG. 27.

Condition (3): Edge Pattern of a Thin Line (EA1) of a 2-Pixel Width

If all of the following conditions are satisfied concerning the watching pixel b22 and 2 pairs of 2 opposing pixels (b12 and b32, or b21 and b23) among 4 peripheral pixels b21, b23, b12, and b32, situated on the left, right, top and bottom of the watching pixel b22, respectively, then the processing region fits the edge pattern of a thin line (EA1) of a 2-pixel width.

Watching pixel b22: BTC(b22)=11. The identification flag may be either flag(b22)=0 or flag(b22)=1.

4 peripheral pixels b21, b12, b23, and b32: 2 pairs of opposing 2 pixels b12 and b32 and b21 and 23 have the identification flag of flag(bij)=0 and all of the 2 pixels of the pairs satisfy the following i) or ii).

i) If the quantized data of the peripheral pixels is BTC(bij)=00, then the peripheral pixels must satisfy {Max(b22)−min(bij)}>Th1. That is, the min(bij) of the peripheral pixels must be smaller than the maximum value Max(b22) of the watching pixel b22 by an amount equal to or more than the threshold value Th1.

ii) If the quantized data of the peripheral pixels is BTC(bij)≠00, then the peripheral pixels must satisfy {Max(b22)−Max(bij)}>Th1. That is, the maximum value Max(bij) of the peripheral pixels must be smaller than the maximum value Max(b22) of the watching pixel b22 by an amount equal to or more than the threshold value Th1.

When the condition (3) is satisfied, the edge classification section 3 judges all of the pixels aij's the ones constituting an edge. The pixels aij's are ones of the 2×2 pixels of the expanded image corresponding to the watching pixel b22. The edge classification section 3 sets the edge classification to a thin line (EA1) of a 2-pixel width. Then, the edge classification section 3 generates an edge signal concerning each pixel aij (1200 dpi) and outputs the generated edge signal.

Figure 28:
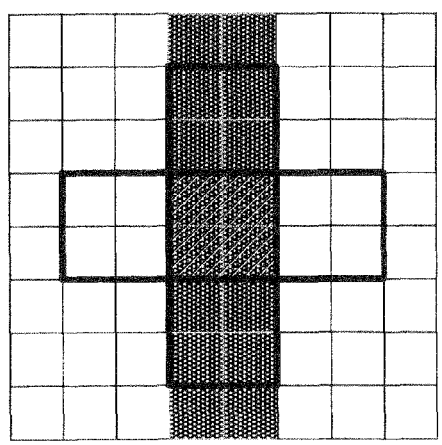
FIG. 28 is a diagram showing an edge pattern and an edge classification of watching pixels in the pattern.

A pattern as shown in FIG. 28 is given as an edge pattern example satisfying the condition (3). In FIG. 28, the watching pixel b22 is a half tone region and has an identification flag of flag(b22)=0. Moreover, both of the peripheral pixels b22 and b23 opposite to each other with the watching pixel b22 put between them are half tone regions having the identification flag of flag(bij)=0 and the quantized data BTC(bij)=00. Because the maximum value Max(b22) of the watching pixel b22 is Max(b22)=255 and the minimum value min(bij) of the peripheral pixels b21 and b23 is min(bij)=0, the maximum value Max(b22) and the minimum value min(bij) satisfy the relational expression {Max(b22)−min(bij)}>Th1. Consequently, the edge classification section 3 judges that the processing region fits the edge pattern of the thin line of the 2-pixel width. Moreover, the edge classification section 3 outputs an edge signal indicating that the edge classification of all of the pixels aij's of the 2×2 pixels of the expanded image corresponding to the watching pixel b22 is the thin line (EA1) of the 2-pixel width as shown in FIG. 28.

Condition (4): Edge Pattern of a Thin Line (EA1) of a 2-Pixel Width

If all of the following conditions are satisfied concerning the watching pixel b22 and 8 peripheral pixels b11-b13, b21, b23, and b31-b33, then the processing region fits the edge pattern of a thin line of a 2-pixel width.

Watching pixel b22; flag(b22)=1 and BTC(b22)=11.

8 peripheral pixels b11-b13, b21, b23, and b31-b33: all of the peripheral pixels having an identification flag flag(bij)=0 among the 8 peripheral pixels b11-b13, b21, b23, and b31-b33 must not satisfy the following i) and ii).

i) If the quantized data of the peripheral pixels bij's is BTC(bij)=00, then the peripheral pixels satisfy |Max(b22)−min(bij)|<Th1. That is, the difference between the minimum value min(bij) of the peripheral pixels and the maximum value Max(b22) of the watching pixel b22 is equal to or less than the threshold value Th1.

ii) If the quantized data of the peripheral pixels bij's is BTC(bij)≠00, then the peripheral pixels satisfy |Max(b22)−Max(bij)|<Th2. That is, the difference value of the maximum value Max(bij) of the peripheral pixels and the maximum value M(b22) of the watching pixel b22 is equal to or less than the threshold value Th2.

Also the threshold value Th2 is a threshold value for judging the existence of an edge similarly to the threshold value Th1, but the threshold value Th2 can be set to a value different from the threshold value Th1.

When the condition (4) is satisfied, the edge classification section 3 judges the pixel aij the pixel constituting an edge at which pixel aij the value of the density pattern to be predicted from the watching pixel b22 is 1. The pixel aij is one of the 2×2 pixels of the expanded image corresponding to the watching pixel b22. The edge classification section 3 sets the edge classification to the thin line (EA1) of the 2-pixel width. Moreover, the edge classification section 3 sets the edge classification to a thin line (EA1) of a 2-pixel width. Then, the edge classification section 3 judges that the pixels aij's of the density pattern of the value 0 are not an edge (nE). Then, the edge classification section 3 generates an edge signal concerning each pixel aij (1200 dpi) and outputs the generated edge signal.

Figure 29:
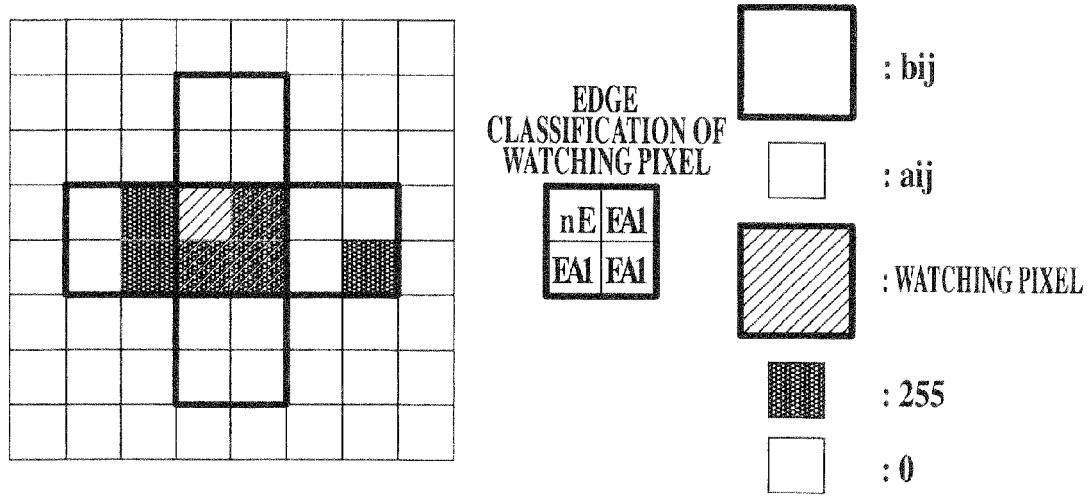
FIG. 29 is a diagram showing an edge pattern and an edge classification of watching pixels in the pattern.

A pattern as shown in FIG. 29 is given as an edge pattern example satisfying the condition (4). In FIG. 29, the identification flag of the watching pixel b22, which is a high resolution region, is flag(b22)=1. Moreover, the peripheral pixels b12 and b32 are in a half tone region having the identification flag flag(bij)=0 among the peripheral pixels b21, b12, b23 and b32. The quantized data of the peripheral pixels b12 and b32 is BTC(bij)=00; the minimum value min(bij) of the peripheral pixels b12 and 32 is min(bij)=0; the maximum value of the watching pixel b22 is Max(b22)=255. Consequently, the maximum value Max(b22) and the minimum value min(bij) satisfy the relational expression {Max(b22)−min (bij)}>Th2. Consequently, the processing region does not satisfy the conditions of i) and ii) of (4) mentioned above. Consequently, the edge classification section 3 judges that the processing region fits the edge pattern of 2-pixel line width. Moreover, as shown in FIG. 29, the edge classification section 3 outputs an edge signal indicating that the edge classification of all of the pixels aij's of the density pattern of value 1, which density pattern is predicted from the watching pixel b22, is the thin line (EA1) of the 2-pixel width as shown in FIG. 29.

Condition (5): Edge Patterns of an Outer Edge (EA2) and an Inner Edge (EA3)

Figure 30:
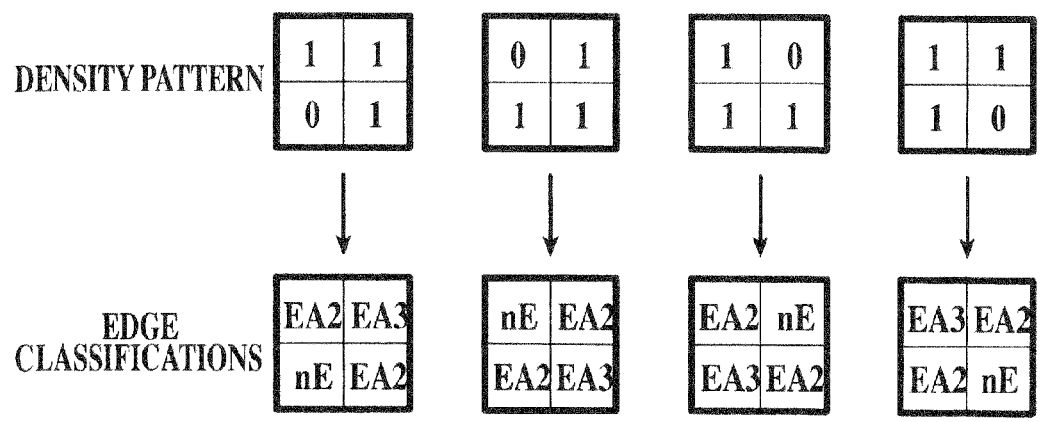
FIG. 30 is a diagram showing the relations between density patterns and edge classifications.

If the quantized data of the watching pixel b22 is BTC (b22)=11 and the identification flag of the watching pixel b22 is flag(b22)=1, then the processing region fits the edge patterns of the outer edge and the inner edge. When the condition (5) is satisfied, the edge classification section 3 judges the pixel aij the pixel constituting an edge at which pixel aij the value of the density pattern to be predicted from the watching pixel b22 is 1. The pixel aij is one of the 2×2 pixels of the expanded image corresponding to the watching pixel b22 as shown in FIG. 30. Because 3 pixels aij's which have the values of the density patterns being 1 exist, the 2 pixels aij's adjoining the pixel aij having the value of the density pattern of 0 among the 3 pixels aij's are classified to the outer edge (EA2), and the other pixel aji is classified to the inner edge (EA3). Moreover, the edge classification section 3 judges that the pixel aij having the value of the density pattern of 0 is not an edge (nE). Then, the edge classification section 3 generates an edge signal concerning each pixel aij (1200 dpi) and outputs the generated edge signal.

Figure 31:
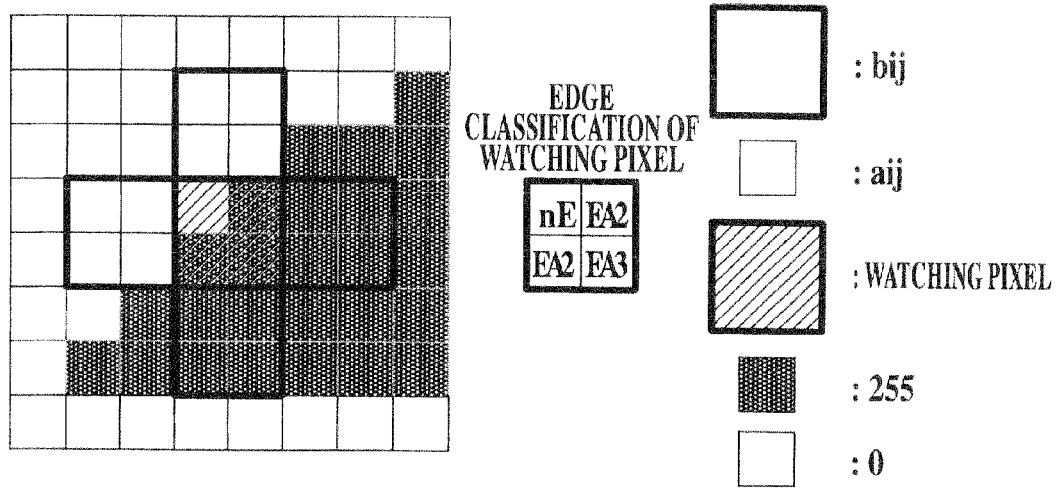
FIG. 31 is a diagram showing an edge pattern and edge classifications of watching pixels in the pattern.

A pattern as shown in FIG. 31 is given as an edge pattern example satisfying the condition (5). In FIG. 31, the watching pixel b22 is a high resolution region, which has an identification flag flag(b22)=1 and the quantized data BTC(b22)=11. Consequently, the edge classification section 3 outputs an edge signal indicating that the 2 pixels aij's adjoining the value 0 are the outer edge (EA2) among the 3 pixels aij's having the value of the density patterns of 1, which density patterns are predicted from the watching pixel b22 and the other pixel aij is the inner edge (EA3).

Condition (6): Edge Pattern of an Outer Edge (EA2)

If the identification flag of the watching pixel b22 is flag (b22)=1, the processing region fits the edge pattern of an outer edge.

Figure 32:
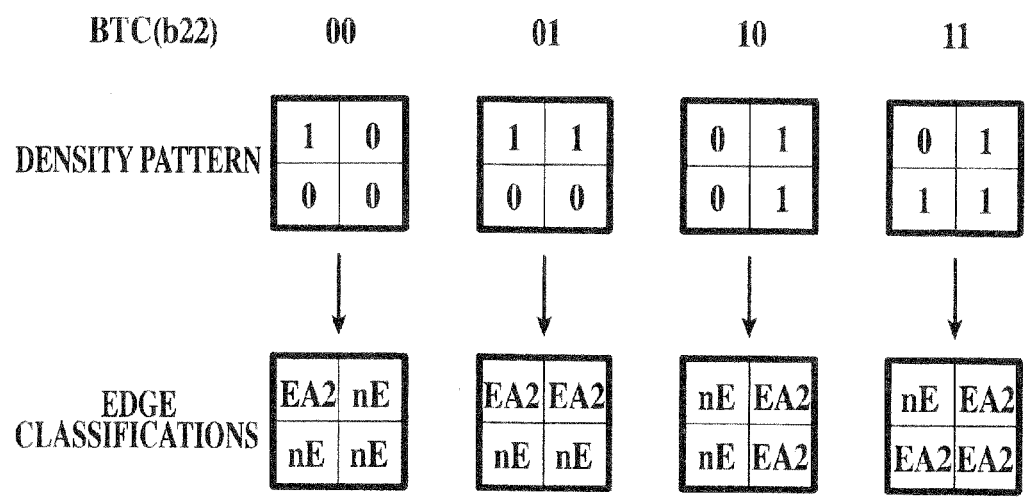
FIG. 32 is a diagram showing relations between density patterns and edge classifications.

When the condition (6) mentioned above is satisfied, the edge classification section 3 judges the pixel aij the one constituting an edge. At the pixel aij, the value of a density pattern to be predicted from the watching pixel b22 becomes 1. The pixel aij is one of the 2×2 pixels of the expanded image corresponding to the watching pixel b22 as shown in FIG. 32. Moreover, the edge classification section 3 judges the pixel aij at which the value of the density pattern becomes 1 the outer edge (EA2), and judges the pixel aij at which the values of the density pattern become 0 not an edge (nE).

Figure 33:
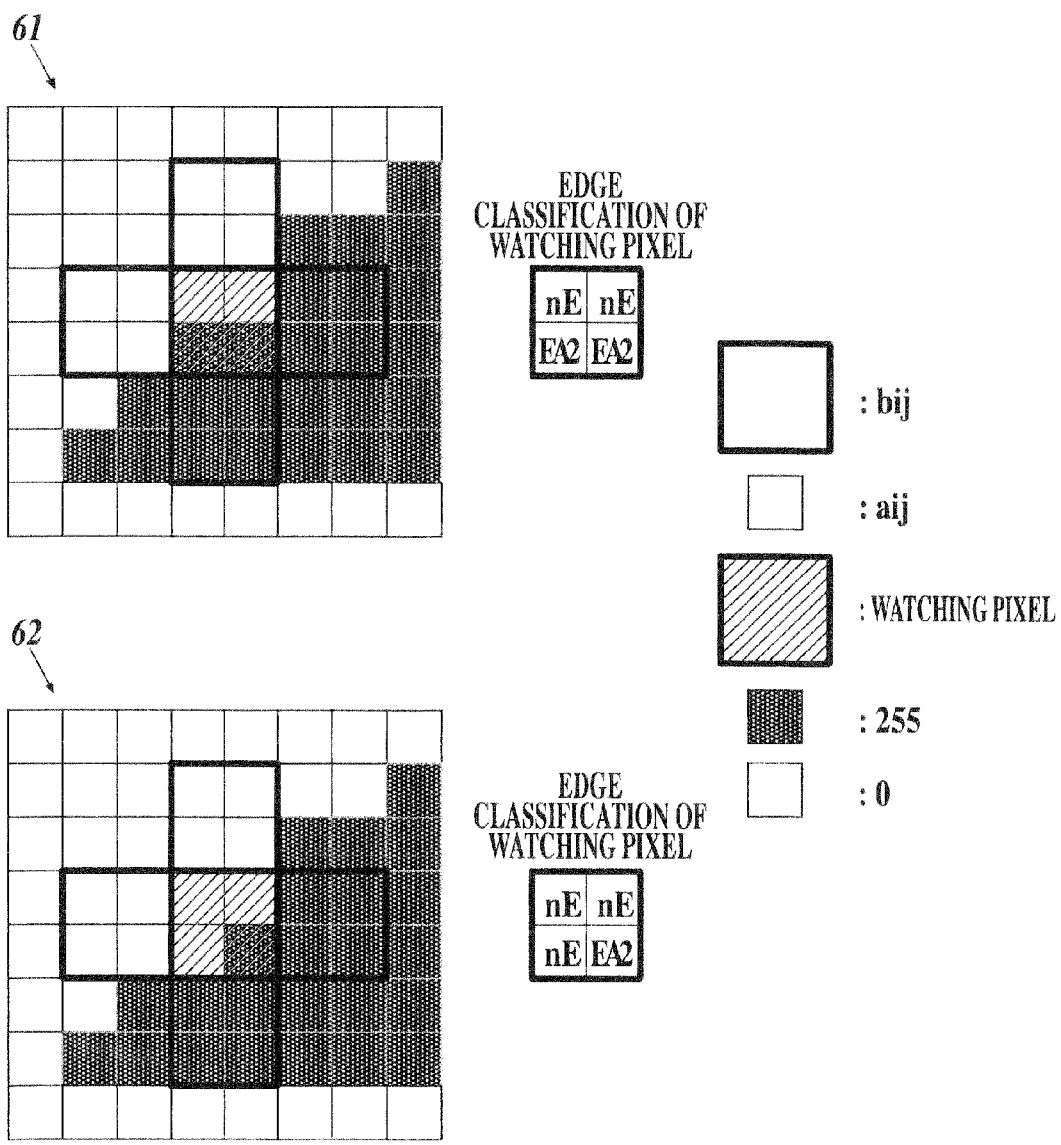
FIG. 33 is a diagram showing edge patterns and edge classifications of watching pixels in the pattern.

Patterns as shown In FIG. 33 are given as the edge pattern examples satisfying the condition (6).

In the pattern 61 shown in FIG. 33, the watching pixel b22 is a high resolution region having an identification flag flag (b22)=1. Because the quantized data is BTC(b22)=10, the edge classification section 3 outputs an edge signal indicating that the two pixels aij's having a value of a density pattern of 1 are the outer edge (EA2).

Moreover, in a pattern 62 shown in FIG. 33, the watching pixel b22 has an identification flag flag(b22)=1 and quantized data BTC(b22)=00. The edge classification section 3 outputs an edge signal indicating that one pixel aij having the value of density pattern of 1 is the outer edge (EA2) as to the pattern 62.

Condition (7): Edge Patterns of the Outer Edge (EA2) and the Inner Edge (EA3)

If the following condition (7a) or (7b) is satisfied concerning the watching pixel b22 and 4 peripheral pixels b21, b23, b12, and b32, situated on the left, right, top and bottom of the watching pixel b22, respectively, the processing region fits the edge patterns of the outer edge (EA2) and the inner edge (EA3).

(7a): the watching pixel b22 must have an identification flag flag(b22)=0 and quantized data BTC(b22)=11.

4 peripheral pixels b21, b12, b23, and b32: they must satisfy either of the following conditions i) and ii).

i) Any of the 4 peripheral pixels must have an identification flag flag(bij)=0 and quantized data BTC(bij)=00, and {Max(b22)−min(bij)}>Th1 must be true concerning the peripheral pixel having the identification flag flag(bij)=0 and the quantized data BTC(bij)=00. That is, the minimum value min(bij) of the peripheral pixels must be smaller than the maximum, value Max(b22) of the watching pixel b22 by an amount equal to or more than a threshold value Th1.

ii) Any of the 4 peripheral pixels must have the identification flag flag(bij)=0 and quantized data BTC(bij)≠00, and {Max(b22)−Max(bij)}>Th1 must be true concerning the pixel having the identification flag flag(bij)=0 and the quantized data BTC(bij)≠00. That is, the maximum value Max(bij) of the peripheral pixels must be smaller than the maximum value Max(b22) of the watching pixel b22 by the amount equal to or more than the threshold value Th1.

(7b): the watching pixel b22 must have an identification flag flag(b22)=0 and quantized data BTC(b22)=00.

4 peripheral pixels b21, b12, b23, and b32: they must satisfy either of the following conditions i) and ii).

i) Any of the 4 peripheral pixels must have the identification flag flag(bij)=0 and the quantized data BTC(bij)=00, and {min(b22)−min(bij)}>Th1 must be true concerning the peripheral pixel having the identification flag flag(bij)=0 and the quantized data BTC(bij)=00. That is, the minimum value min(bij) of the peripheral pixels must be smaller than the minimum value min(b22) of the watching pixel b22 by an amount equal to or more than a threshold value Th1.

ii) Any of the 4 peripheral pixels must have the identification flag flag(bij)=0 and quantized data BTC(bij)≠00, and {mi(b22)−Max(bij)}>Th1 must be true concerning the pixel having the identification flag flag(bij)=0 and the quantized data BTC(bij)≠00. That is, the maximum value Max(bij) of the peripheral pixels must be smaller than the minimum value min(b22) of the watching pixel b22 by an amount equal to or more than the threshold value Th1.

When the condition (7) is satisfied, the edge classification section 3 classifies the edges as follows by setting the pixels aij's adjoining extracted peripheral pixels bij's to the outer edge (EA2) and the other pixels aij's to the inner edge (EA3) among the pixels aij's of the 2×2 pixels of the expanded image corresponding to the watching pixel b22.

i) If a peripheral pixel is extracted, then 2 pixels aij's adjoining the peripheral pixel is classified as the output edge (EA2) and the other pixels aij's are classified to the inner edge (EA3).

ii) If 2 peripheral pixels adjoining the peripheral pixel in an oblique direction are extracted, then 3 pixels aij's adjoining the 2 peripheral pixels are classified as the outer edge (EA2) and the other 1 pixel aij is classified, as the inner edge (EA3).

iii) If 2 peripheral pixels opposed to each other with the watching pixel b22 put between the 2 peripheral pixels are extracted, all of the 4 pixels aij adjoining the 2 peripheral pixels are classified as the outer edge (EA2).

iv) If 3 peripheral pixels or more are extracted, all of the 4 pixels aij are classified as the outer edge (EA2).

Patterns as shown, in FIG. 34 are given as edge pattern examples satisfying the condition (7).

In a pattern 71 shown in FIG. 34, the watching pixel b22 has an identification flag flag(b22)=0 and quantized data BTC (b22)=11; the peripheral pixels b12 and b21 severally have an identification flag flag(bij)=0 and quantized data BTC(bij)=00; the peripheral pixels b23 and b32 severally have an identification flag flag(bij)=0 and quantized data BTC(bij)= 11. Because the minimum value min's of the peripheral pixels b12 and b21 min(bij)=0 and the maximum value Max(b22) of the watching pixel is Max(b22)=255, the processing region satisfies the relational expression {Max(b22)−min(bij)}>Th1, and the edge classification section 3 extracts the peripheral pixels b12 and b21 in conformity with the condition (7a) i). On the other hand, because the maximum value Max(bij) of the peripheral pixels b23 and b32 and the maximum value Max(b22) of the watching pixel b22 are Max(bij)=Max(b22)=255, the peripheral pixels b23 and b32 do not satisfy the condition (7a) ii), and the edge classification section 3 does not extract the peripheral pixels b23 and b32. Consequently, as to the pattern 71, the edge classification section 3 outputs an edge signal indicating that the 3 pixels aij's adjoining the 2 peripheral pixels b12 and b21 are the outer edge (EA2) and the other 1 pixel aij is the inner edge (EA3) among the pixels aij's of the 2×2 pixels of the expanded image corresponding to the watching pixel b22 as shown in FIG. 34.

Moreover, in a pattern 72 shown in FIG. 34, the watching pixel b22 has an identification flag flag(b22)=0 and quantized data BTC (b22)=11; the peripheral pixels b12 and b21 severally have an identification flag flag(bij)=0 and quantized data BTC(bij)=00; the peripheral pixels b23 and b32 severally have an identification flag flag(bij)=0 and quantized data BTC(bij)=11. Because the minimum value min's of the peripheral pixels b12 and b21 min(bij)=0 and the minimum value min(b22) of the watching pixel is min(b22)=255, the processing region satisfies the relational expression {min(b22)−min(bij)}>Th1, and the edge classification section 3 extracts the peripheral pixels b12 and b21 in conformity with the condition (7b) i). On the other hand, because the minimum value mi(bij) of the peripheral pixels b23 and b32 is min(bij)= 255, the peripheral pixels b23 and b32 do not satisfy the condition (7b) ii), and the edge classification section 3 does not extract the peripheral pixels b23 and b32. Consequently, as to the pattern 72, the edge classification section 3 outputs an edge signal indicating that the 3 pixels aij's adjoining the 2 peripheral pixels b12 and b21 are the outer edge (EA2) and the other 1 pixel aij is the inner edge (EA3) among the pixels aij's of the 2×2 pixels of the expanded image corresponding to the watching pixel b22 as shown in FIG. 34.

Condition (8): Edge Patterns of the Outer Edge (EA2) and the Inner Edge (EA3)

The edge classification section 3 extracts the combinations of the peripheral pixels satisfying all of the following conditions concerning 2 pixels (b11 and b33 or b13 and b31) opposed to each other with the watching pixel b22 put between the 2 pixels in oblique directions among the watching pixel b22 and the 8 peripheral pixels b11-b13, b21, b23, and b31-b33.

The watching pixel b22 must have an identification flag flag(b22)=0 and quantized data BTC(b22)=11.

The peripheral pixels b11 and b33, or b13 and b31 must have an identification flag flag(bij)=0, and must satisfy either of the following conditions i) and ii).

i) If the quantized data BTC(bij) of the peripheral pixels is BTC(bij)=00, then the peripheral pixels must satisfy the relational expression |Max(b22)−min(bij)|>Th2. That is, the difference between the minimum value min(bij) of the peripheral pixels and the maximum value Max(b22) of the watching pixel b22 must be equal to or less the threshold value Th2.

ii) If the quantized data BTC(bij) of the peripheral pixels is BTC(bij)≠00, then the peripheral pixels must satisfy the relational expression |Max(b22)|Max(bij)|<Th2. That is, the difference between the maximum value Max(bij) of the peripheral pixels and the maximum value Max(b22) of the watching pixel b22 must be equal to or less the threshold value Th2.

If the combination of the peripheral pixels b11 and b33 is extracted in conformity with the conditions i) and ii), then if the peripheral pixels b21 and b32 further satisfy the following condition iii), the processing region fits the edge patterns of the outer edge and the inner edge.

iii) Both of the peripheral pixels b21 and b32 must have the identification flag flag(bij)=1 and the quantized data BTC (bij)= 00.

Moreover, the peripheral pixels b21 and b32 must satisfy the relational expression |Max(b22)−Max(bij)|<Th2. That is, the difference between the maximum value Max(bij) of the peripheral pixels b21 and b32 and the maximum value Max (b22) of the watching pixel b22 is equal to or less than the threshold value Th2.

In this case, the edge classification section 3 outputs an edge signal indicating that the 1 pixel aij adjoining the extracted peripheral pixels b21 and b32 is the outer edge (EA2) and the other pixels aij's are the inner edge (EA3) among the pixels aij's of the 2×2 pixels of the expanded image corresponding to the watching pixel b22.

Similarly, if the combination of the peripheral pixels b11 and b33 is extracted in conformity with the conditions i) and ii), and further if the peripheral pixels b12 and b23 satisfy the following condition iv), then the processing region fits the edge patterns of the outer edge and the inner edge.

iv) Both of the peripheral pixels b12 and b23 must have the identification flag flag(bij)=1 and the quantized data BTC (bij)= 00.

Moreover, the peripheral pixels b12 and b23 must satisfy the relational expression |Max(b22)−Max(bij)|<Th2. That is, the difference between the maximum value Max(bij) of the peripheral pixels b12 and b23 and the maximum value Max (b22) of the watching pixel b22 is equal to or less than the threshold, value Th2.

In this case, the edge classification section 3 outputs an edge signal indicating that the 1 pixel aij adjoining the peripheral pixels b12 and b23 is the outer edge (EA2) and the other pixels aij's are the inner edge (EA3) among the pixels aij's of the 2×2 pixels of the expanded image corresponding to the watching pixel b22.

On the other hand, if the combination of the peripheral pixels b13 and b31 is extracted in conformity with the conditions i) and ii), and further if the peripheral pixels b12 and b21 satisfy the following condition v), then the processing region fits the edge patterns of the outer edge and the inner edge.

v) Both of the peripheral pixels b12 and b21 must have the identification flag flag(bij)=1 and the quantized data BTC (bij)= 00.

Moreover, the peripheral pixels b12 and b21 must satisfy the relational expression |Max(b22)−Max(bij)|<Th2. That is, the difference between the maximum value Max(bij) of the peripheral pixels b12 and b21 and the maximum value Max (b22) of the watching pixel b22 is equal to or less than the threshold value Th2.

In this case, the edge classification section 3 classifies edges so that the 1 pixel aij adjoining the peripheral pixels b12 and b21 is the outer edge (EA2) and the other pixels aij's are the inner edge (EA3) among the pixels aij's of the 2×2 pixels of the expanded image corresponding to the watching pixel b22.

Similarly, if the combination of the peripheral pixels b13 and b31 is extracted, in conformity with the conditions i) and ii), and further if the peripheral pixels b23 and b32 satisfy the following condition vi), then the processing region fits the edge patterns of the outer edge and the inner edge.

vi) Both of the peripheral pixels b23 and b32 must have the identification flag flag(bij)=1 and the quantized data BTC (bij)= 00.

Moreover, the peripheral pixels b23 and b32 must satisfy the relational expression |Max(b22)−Max(bij)|<Th2. That is, the difference between the maximum value Max(bij) of the peripheral pixels b23 and b32 and the maximum value Max (b22) of the watching pixel b22 is equal to or less than the threshold value Th2.

In this case, the edge classification section 3 classifies edges so that the 1 pixel aij adjoining the peripheral pixels b23 and b32 is the outer edge (EA2) and the other pixels aij's are the inner edge (EA3) among the pixels aij's of the 2×2 pixels of the expanded image corresponding to the watching pixel b22.

A pattern as shown in FIG. 35 is given as an edge pattern example satisfying the condition (8). In FIG. 35, the watching pixel b22 has an identification flag flag(b22)=0 and quantized data BTC(b22)=11; the combination of the peripheral pixels b13 and b31 has an identification flag flag(bij)=0 and quantized data BTC(bij)≠00; the maximum value Max(b22) of the watching pixel b22 and the maximum value Max(bij) of the combination are Max(b22)=Max(bij)=255 and the processing region satisfies the relational expression |Max(b22)−Max (bij)|<Th2. Consequently, the condition (8) ii) mentioned above is satisfied. Furthermore, the peripheral pixels b12 and b21 severally has an identification flag flag(bij)=1 and quantized data BTC(bij)=00, and consequently the peripheral pixels b12 and b21 satisfy the condition iii) mentioned above. Consequently, the edge classification section 3 outputs an edge signal indicating that 1 pixel aij adjoining the peripheral pixels b12 and b23 is the outer edge (EA2) and the other pixels aij's is the Inner edge (EA3) among the 2×2 pixels aij's of the expanded image corresponding to the watching pixel b22.

Condition (9): Edge Patterns of the Outer Edge (EA2) and the Inner Edge (EA3)

The edge classification section 3 extracts the combinations of the peripheral pixels satisfying all of the following conditions concerning 2 pixels (b11 and b33, or b13 and b31) opposed to each other with the watching pixel b22 put between the 2 pixels in oblique directions among the watching pixel b22 and the 8 peripheral pixels b11-b13, b21, b23, and b31-b33.

The watching pixel b22 must have an identification flag flag(b22)=0 and quantized data BTC(b22)=00.

The peripheral pixels b11 and b33, or b13 and b31 must have an Identification flag flag(bij)=0, and must satisfy either of the following conditions i) and ii).

i) If the quantized data BTC(bij) of the peripheral pixels is BTC(bij)=00, then the peripheral pixels must satisfy the relational expression |min(b22)−min(bij)|<Th2. That is, the difference between the minimum value min(bij) of the peripheral pixels and the minimum value min(b22) of the watching pixel b22 must be equal to or less the threshold value Th2.

ii) If the quantized data BTC(bij) of the peripheral pixels is BTC(bij)≠00, then the peripheral pixels must satisfy the relational expression |min(b22)−Max(bij)|<Th2. That is, the difference between the maximum value Max(bij) of the peripheral pixels and the minimum value min(b22) of the watching pixel b22 must be equal to or less the threshold value Th2.

If the combination of the peripheral pixels b11 and b33 is extracted in conformity with the conditions i) and ii), and further if the peripheral pixels b21 and b32 further satisfy the following condition iii), then the processing region fits the edge patterns of the outer edge and the inner edge.

iii) Both of the peripheral pixels b21 and b32 must have the identification flag flag(bij)=1 and the quantized data BTC (bij)−00.

Moreover, the peripheral pixels b21 and b32 must satisfy the relational expression |min(b22)−Max(bij)|<Th2. That is, the difference between the maximum value Max(bij) of the peripheral pixels b21 and b32 and the minimum value min (b22) of the watching pixel b22 is equal to or less than the threshold value Th2.

In this case, the edge classification section 3 outputs an edge signal indicating that the 1 pixel aij adjoining the peripheral pixels b21 and b32 is the outer edge (EA2) and the other pixels aij's are the inner edge (EA3) among the pixels aij's of the 2×2 pixels of the expanded image corresponding to the watching pixel b22.

Similarly, if the combination of the peripheral pixels b11 and b33 is extracted in conformity with the conditions i) and ii), and further if the peripheral pixels b12 and b23 satisfy the following condition iv), then the processing region fits the edge patterns of the outer edge and the inner edge.

iv) Both of the peripheral pixels b12 and b23 must have the identification flag flag(bij)=1 and the quantized data BTC (bij)= 00.

Moreover, the peripheral pixels b12 and b23 must satisfy the relational expression |min(b22)−Max(bij)|<Th2. That is, the difference between the maximum value Max(bij) of the peripheral pixels b12 and b23 and the maximum value Max (b22) of the watching pixel b22 is equal to or less than the threshold value Th2.

In this case, the edge classification section 3 outputs an edge signal indicating that the 1 pixel aij adjoining the peripheral pixels b12 and b23 is the outer edge (EA2) and the other pixels aij's are the inner edge (EA3) among the pixels aij's of the 2×2 pixels of the expanded image corresponding to the watching pixel b22.

On the other hand, if the combination of the peripheral pixels b13 and b21 is extracted in conformity with the conditions i) and ii), and further if the peripheral pixels b12 and b21 satisfy the following condition v), then the processing region fits the edge patterns of the outer edge and the inner edge.

v) Both of the peripheral pixels b12 and b21 must have the identification flag flag(bij)=1 and the quantized data BTC (bij)= 00.

Moreover, the peripheral pixels b12 and b21 must satisfy the relational expression |min(b22)−Max(bij)|<Th2. That is, the difference between the maximum value Max(bij) of the peripheral pixels b12 and b21 and the minimum value min (b22) of the watching pixel b22 is equal to or less than the threshold value Th2.

In this case, the edge classification section 3 classifies edges so that the 1 pixel aij adjoining the peripheral pixels b12 and b21 is the outer edge (EA2) and the other pixels aij's are the inner edge (EA3) among the pixels aij's of the 2×2 pixels of the expanded image corresponding to the watching pixel b22.

Similarly, if the combination of the peripheral pixels b13 and b31 is extracted in conformity with the conditions i) and ii), and further if the peripheral pixels b23 and b32 satisfy the following condition vi), then the processing region fits the edge patterns of the outer edge and the inner edge.

vi) Both of the peripheral pixels b23 and b32 must have the identification flag flag(bij)=1 and the quantized data BTC (bij) = 00.

Moreover, the peripheral pixels b23 and b32 must satisfy the relational expression |Max(b22)−Max(bij)|<Th2. That is, the difference between the maximum value Max(bij) of the peripheral pixels b23 and b32 and the minimum value min (b22) of the watching pixel b22 is equal to or less than the threshold value Th2.

In this case, the edge classification section 3 classifies edges so that the 1 pixel aij adjoining the peripheral pixels b23 and b32 is the outer edge (EA2) and the other pixels aij's are the inner edge (EA3) among the pixels aij's of the 2×2 pixels of the expanded image corresponding to the watching pixel b22.

Figure 37:
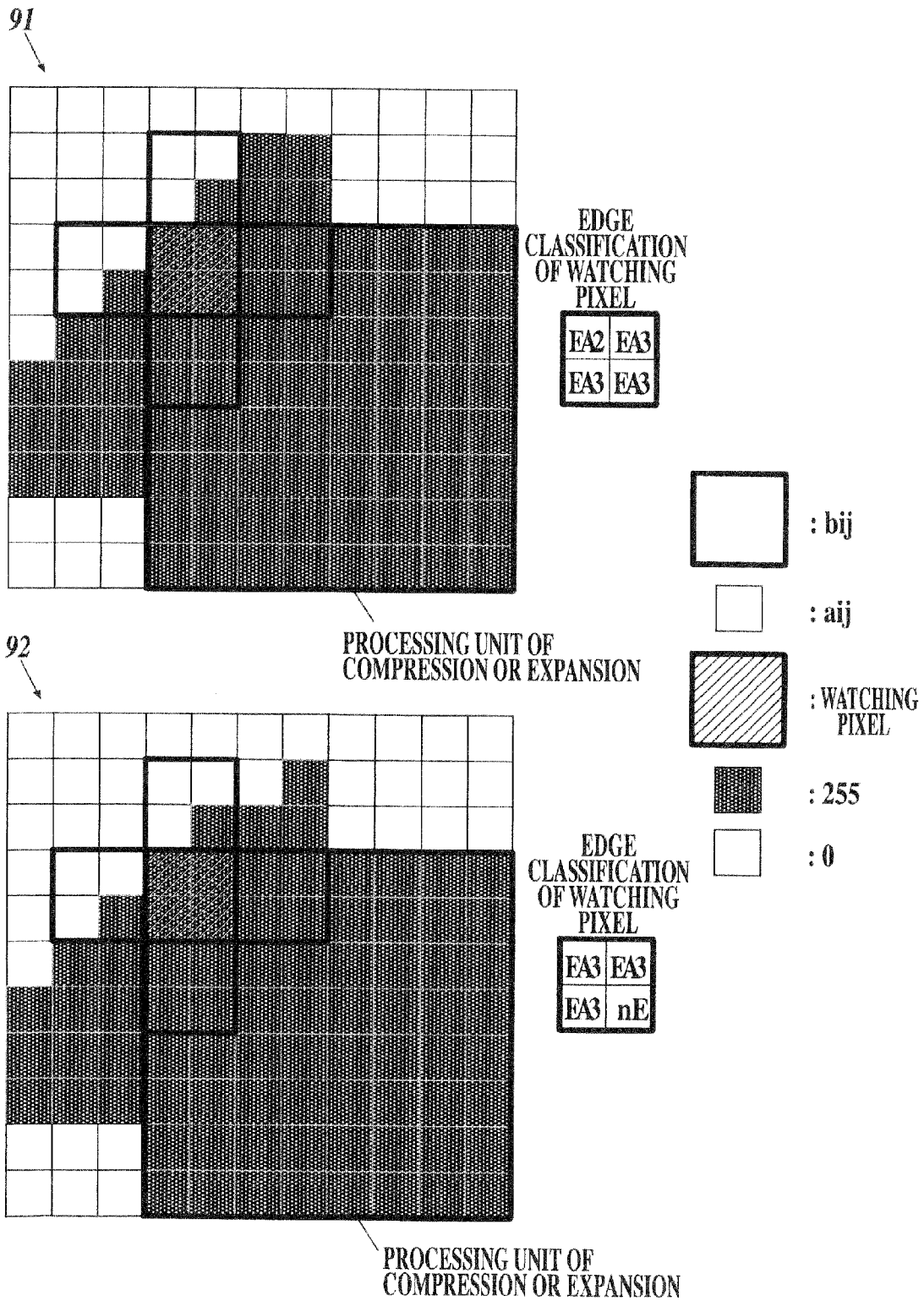
FIG. 37 is a diagram showing edge patterns and edge classifications of watching pixels in the pattern.

Edge patterns 91 shown in FIG. 37 are given as edge pattern examples detected by the condition (9) mentioned above. In the pattern 91, the watching pixel b22 has an identification flag flag(b22)=0. Because the processing region of 8×8 pixels to which the watching pixel b22 belongs has the maximum value Max and the minimum value min which Max=min=255, the quantized data BTC(b22) of the watching pixel b22 is BTC(b22)=00. Moreover, the combination of the peripheral pixels b13 and b31 has an identification flag flag (bij)=0 and quantized data BTC(bij)=11. Since the minimum value min of the watching pixel b22 is min(b22)=255 and the maximum value Max(bij) of the peripheral pixels b13 and b31 is Max(bij)=255, the processing region satisfies the relational expression |mini(b22)−Max(bij)|=0<Th2, and satisfies the condition (9) i) and ii) mentioned above. Furthermore, the peripheral pixels b12 and b21 severally has an identification flag flag(bij)=1 and quantized data BTC(bij)=00. Since the maximum value Max(bij) of the peripheral pixels b12 and b21 is Max(bij)=255, the peripheral pixels b12 and b21 satisfy the relation expression |min(b22)−Max(bij)|=0<Th2 and the condition v) mentioned above. Consequently, the edge classification section 3 classifies edges so that the pixels aij adjoining both of the peripheral pixels b12 and b21 as the outer edge (EA2) and the other pixels aij's are the inner edge (EA3) among the 2×2 pixels aij's of the expanded image corresponding to the watching pixel b22.

Condition (10): An Edge Pattern of the Inner Edge (EA3)

The watching pixel b22 and 4 peripheral pixels b21, b23, b12, and b32 situated on the left, the right, the top, and the bottom of the watching pixel b22, respectively, fit the edge pattern of an inner edge if the watching pixel b22 and the 4 peripheral pixels b21, b23, b12, and b32 satisfy the following conditions (10a) and (10b).

(10a) The watching pixel b22 must have am identification flag flag(b22)=0 and quantized data BTC(b22)=11.

The peripheral pixels b21, b23, b12, and b32: any of the peripheral pixel b21, b23, b12, and b32 must have an identification flag flag(bij)=1, and the peripheral pixel having the flag(bij)=1 must satisfy the relational expression |Max(b22)−Max(bij)|<Th2. That is, the difference between the maximum value Max(bij) of the peripheral pixels and the maximum value Max(b22) of the watching pixel b22 must be equal to or less the threshold value Th2.

(10b) The watching pixel b22 has an identification flag flag(b22)=0 and quantized data BTC(b22)=00.

The peripheral pixels b21, b23, b12, and b32: any of the peripheral pixels b21, b23, b12, and b32 must has an identification flag flag(bij)=1 and must satisfy the relational expression |min(b22)−Max(bij)|<Th2. That is, the maximum value Max(bij) of the peripheral pixels is smaller than the minimum value min(b22) of the watching pixel b22 by the degree of the threshold value Th2 or less.

If the condition (10) is satisfied, then the edge classification section 3 outputs an edge signal indicating that the all of the pixels aij's adjoining the extracted peripheral pixels among the pixels aij's of 2×2 pixels of the expanded image corresponding to the watching pixel b22 are inner edge (EA3).

As an edge pattern example satisfying the condition (10a) mentioned above, the pattern shown in FIG. 36 is given. In FIG. 36, the watching pixel b22 has the identification flag flag(b22)=0 and the quantized data BTC(b22)=11, and the maximum value Max(bij) of the peripheral pixels b12 and b21 having the identification flag flag(bij)=1 is Max(bij)=255. Because the maximum value Max(b22)=255, the maximum values satisfy the relational expression |Max(b22)−Max(bij)|<Th2. Accordingly, the edge classification section 3 outputs an edge signal after classifying all of the pixels aij's adjoining the peripheral pixels b12 and b21 as inner edge (EA3) and the other pixels aij's as not an edge (nE) among the pixels aij of 2×2 pixels of the expanded image corresponding to the watching pixel b22.

Moreover, as an edge pattern example satisfying the condition (10b) mentioned above, a pattern 92 shown in FIG. 37 is given. In the pattern 92, the watching pixel b22 has an identification flag flag(b22)=0. Moreover, because the processing region of the 8×8 pixels to which the watching pixel b22 belongs has the maximum value Max and the minimum value min of Max=min=255, the quantized value BTC(b22) of the watching pixel b22 is BTC(b22)=00. Furthermore, the peripheral pixels b12 and b21 each having the identification flag flag(bij)=1 are included, and the maximum value Max (bij) of the peripheral pixels b12 and b21 is Max(bij)=255. Consequently, the processing region satisfies the relational expression |min(b22)−Max(bij)|=0<Th2 and the condition (10b) mentioned above. Accordingly, the edge classification section 3 outputs an edge signal after classifying all of the pixels aij's adjoining the peripheral pixels b12 and b21 as the inner edge (EA3) and the other pixels aij's as not an edge (nE) among the pixels aij's of the 2×2 pixels of the expanded image corresponding to the watching pixel b22 inner edge (EA3).

FIG. 38 shows a processing result of the performance of the processing of the edge classification mentioned above.

In FIG. 38, g1 shows a compressed image generated by compressing an image including an edge of a certain character by the compression processing mentioned above. g2 shows an expanded image generated by expanding the compressed image g1 by the expansion processing mentioned above. g3 shows a result of the performance of the edge classification processing mentioned above with the use of the compressed image g1, and shows the edge classification in the expanded image g2. In FIG. 38, a region of the pixels aij (1 pixel of pixel bij) of 2×2 pixels common to each of the compressed image g1, the expanded image g2, and the edge classification g3 is shown with a thick frame.

In the compressed image g1, the pixels belonging to a half tone region are shown with oblique lines, and the pixels belonging to a high resolution region are shown by dot patterns. Larger linear densities of the oblique lines or larger dot densities of the dot patterns show larger values of the quantized data BTC(bij).

As it can be known by comparing the compressed image g1 and the expanded image g2, the edge classification section 3 judges that a pixel which is an edge of a character and having a large density difference from the background to be a high resolution region, and judges that a pixel situated within a character having a small density difference from the periphery thereof to be a half tone region. On the other hand, it can be known that the classification is suitably performed in the edge classification g3 so that in the expanded image g2 the pixels corresponding to the outermost contour of a character object is classified as the outer edge (EA2), the pixels on the immediate inside of the former pixels are classified as the inner edge (EA3), and thin line structure part in the character is classified to the thin line (EA1) of the 2-pixel width and the thin line (EA0) of the 1-pixel width.

In such a way, an edge signal output from the edge classification section 3 is used when an expanded image is subjected to image processing. For example, the edge signal is used for switching between performing image processing itself or not-performing image processing, such as the switching of the existence of edge enhancement processing according to whether the edge signals Ed or nE, or which one is the edge signal of EA0-EA3. Alternatively, even in the case of performing the image processing, the edge signal makes it possible to change image processing conditions, such as the changing of a dither matrix used for screen processing to the one dedicated for a thin line structure in case of a thin line structure of EA0 or EA1 among edges.

The case of performing the density adjustment of an edge part with the use of the edge signal Ed will be described here as a use example of the edge signal Ed like that.

Figure 39:
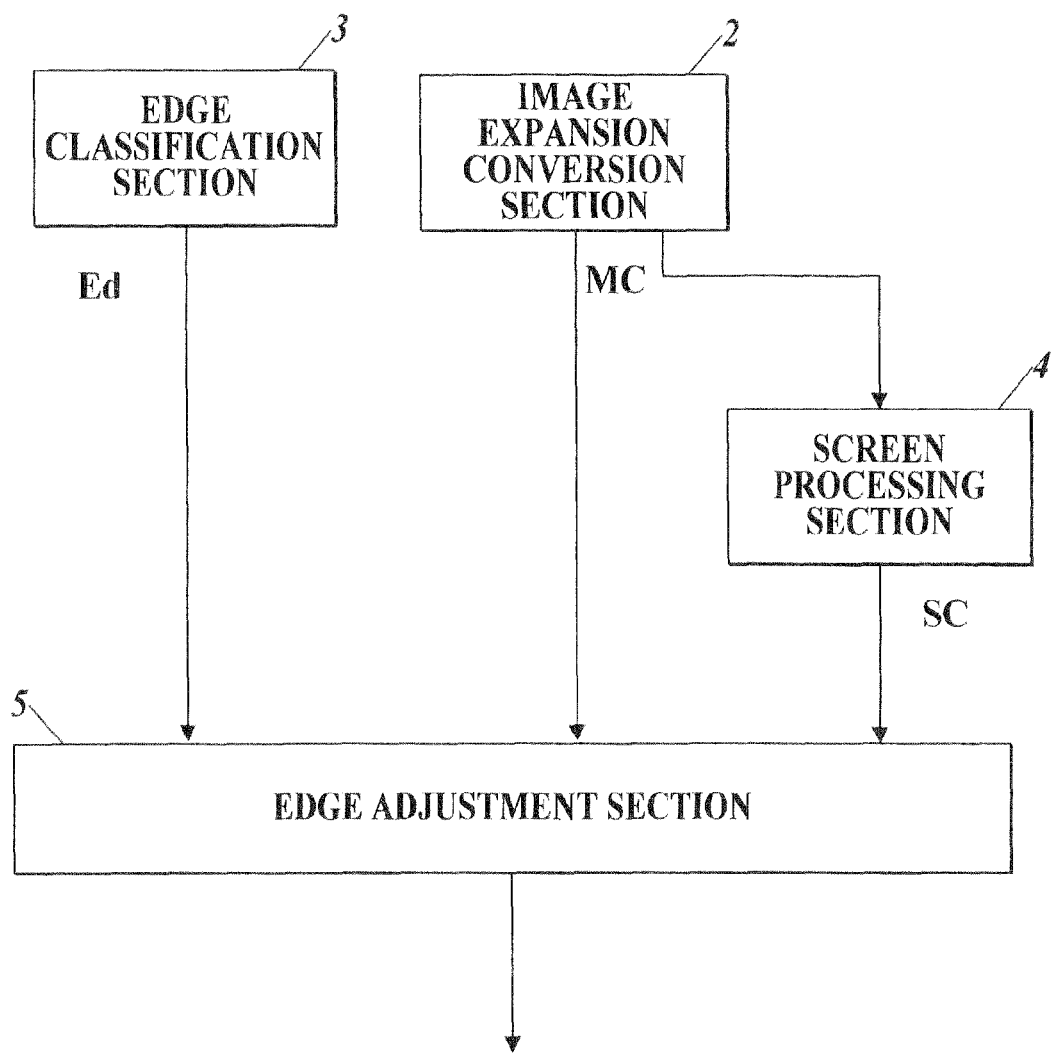
FIG. 39 is a diagram showing chief components functioning at the time of screen processing in the image processing section of FIG. 1.

FIG. 39 is a diagram showing a screen processing section 4 and an edge adjustment section 5, which are components functioning mainly at the time of generating an image to be printed by performing screen processing of an expanded image in the image processing section 10.

The screen processing section 4 performs the screen processing of an expanded image. Any of the error diffusion method, the dither method, and the like may be applied as the screen processing. The processed image subjected to the screen processing is output to the edge adjustment section 5. An original expanded image data value which has not been subjected to the screen processing is denoted by MC, and a screen image data value which has been subjected to the screen processing is denoted by SC here.

A screen image is input into the edge adjustment section 5 together with the original expanded image, which has not been subjected to the screen processing. The edge adjustment section 5 selects either of the original expanded image data value MC and the screen image data value SC every pixel on the basis of the edge signal Ed output from the edge classification section 3, and outputs a data value obtained by adjusting the selected data value.

To put it concretely, the edge adjustment section 5 selects the screen image data value SC and output the screen image data value SC as it is concerning a pixel of the edge signal Ed of nE. On the other hand, the edge adjustment section 5 selects the original expanded image data value MC concerning a pixel of the edge signal Ed of EA0, EA1, EA2, or EA3. Furthermore, the edge adjustment section 5 performs the adjustment of the data value MC with the use of a different coefficient according to the edge signal of Ed, EA2, or EA3.

For example, in the case of Ed=EA2, the edge adjustment section 5 performs the operation of {MC×a+b}×α to adjust the data value MC. In the case of Ed=EA3, the edge adjustment section 5 performs of the operation of {MC×a+b}×(1−α) to adjust the data value MC. The a, the b, and the α are coefficients set beforehand. In this operation, the density adjustment of an edge can be performed: for example, reducing the density of the inner edge together with enlarging the density of an outer edge; enlarging the density of the inner edge together with the reducing the density of the outer edge, by adjusting the coefficient α.

As described above, according to the present embodiment, the edge classification section 3 detects an edge pattern included in an expanded image when a compressed image is expanded, with the use of the identification flag flag(bij), which is included in the compressed image and indicates whether each pixel is a half tone region or a high resolution region, and the quantized data BTC(bij) of each pixel. The edge classification section 3 performs the detection to a watching pixel and the peripheral pixels in the compressed image, and the edge classification section 3 judges the detection of a pattern satisfying the conditions (1)-(10) when the identification flags flag(bij)'s and the quantized data BTC (bij) of these pixels satisfy the conditions (1)-(10) of the identification flags flag(bij)'s and the quantized data BTC (bij) defined beforehand concerning the various patterns of edges.

That is, the edge classification section 3 performs the quantization and the decoding of the half tone region by the BTC system, and quantizes the high resolution region on the basis of the density pattern produced with the use of the original image data value. The edge classification section 3 predicts a quantized pattern at the time of decoding. Consequently, when the edge classification section 3 detects the half tone region from the identification flag flag(bij), the edge classification section 3 can judge that the whole half tone region is decoded to the same decoded data value. When the edge classification section 3 detects the high resolution region, the edge classification section 3 can judge whether the high resolution region fits an edge or not. Furthermore, the edge classification section 3 can judge the degree of a decoded data value of a half tone region with the use of a combination of the quantized data BTC(bij) and the identification flag flag(bij), and can judge the decoded data value and the arrangement of a high resolution region on the basis of the prediction of the density pattern. Accordingly, various patterns of edges and the relations between the identification flags flag(bij)'s and the quantized data BTC(bij) are obtained beforehand, and the patterns and the relations are previously defined as the conditions for judging edge patterns. Then, the edge classification section 3 judges the detection of an edge pattern satisfying the conditions when the conditions are satisfied. Then, the edge classification section 3 performs the edge classification of a watching pixel by the classification method defined to the detected pattern beforehand.

Thereby, the edge classification section 3 can perform the edge classification with the use of the compressed image. Because the data quantity of the processing of classification becomes less than that of the case of performing the edge classification with the use of an expanded image, the processing circuits and line memories necessary for performing the edge classification processing can be reduced, and the edge classification can be performed with a simple configuration.

Moreover, the compressed image is subjected to a resolution conversion to lower resolution than that of the original image by the image compression conversion section 1 at the time of compression, and the expanded image is subjected to a resolution conversion to the resolution same as that of the original image by the image expansion conversion section 2 at the time of expansion. Because the edge classification section 3 performs the edge classification by detecting an edge pattern in an expanded image subjected to the same resolution as that of the original image with the use of a compressed image, the data quantity to be processed can be made to be smaller than that of the performance of the edge classification with the use of the expanded image having larger resolution, and the edge classification with a simpler configuration can be performed.

Moreover, edge classification includes a thin line of a 1-pixel width, a thin line of a 2-pixel width, and an outer edge or an inner edge. Because the edges of these pieces of classification are frequently subjected to image processing different from that of the other image regions, the image processing according to the edge classification with the use of the edge signal indicating the edge classification can be easily performed.

The embodiment described above is a suitable example of the present invention, and the present invention is not limited to this embodiment.

For example, in the aforesaid description, the classification is performed to classify the patterns into 4 ones of the thin line of the 1-pixel width, the thin line of the 2-pixel width, the outer edge, and the inner edge, the classification may be performed by narrowing down the types only to necessary edge classifications, such as only the 2 types of the outer edge and the inner edge. Moreover, the other types of edge classification, for example, the classification of an isolated point and the like may be added.

Moreover, although the embodiment performs the resolution conversion to the high resolution before the time of quantization with regard to each pixel at the time of decoding, the pixels of half tone regions do not need the high resolution especially, and accordingly the decoding of not performing the resolution conversion to the original high resolution of those pixels at the time of expansion to left those pixels at low resolution may be performed.

Moreover, the difference data is not limited to the maximum value Max and the minimum value min as long as the difference data can be used for decoding. For example, the data value of the threshold value THa2, which is an intermediate value, and the minimum value min may be held as difference data, and the other data values Max, THa1, THa3, find the like, which are necessary for decoding, may be calculated from the data values THa2 and min.

Moreover, although in the embodiment, the processing methods of compression and expansion have been described by giving an example of an image generated from the data input from the external PC 200, the image read by the read section 12 may be input into the controller 20 to be similarly processed.

Moreover, the present invention can be applied to a computer apparatus performing image processing besides the MFP. Moreover, the processing of the compression, the expansion, and the edge classification, described above, may be programmed, and the image processing by means of software may be performed with the use of the program. In this case, as a computer-readable medium of the program, a non-volatile memory, such as a read only memory (ROM) and a flash memory, and a portable recording medium, such as a compact disc read-only memory (CD-ROM), can be applied. Moreover, as a medium for supplying the data of the program through a communication line, also a carrier wave can be applied to the present invention.

According to a first aspect of the present invention, the following image processing apparatus is provided. The image processing apparatus includes an edge classification section to detect an edge pattern included in an expanded image expanded from a compressed image by using identification data to indicate whether each of pixels of the compressed image is a half tone region or a high resolution region and quantized data of each of the pixels, the edge classification section performing edge classification according to the detected edge pattern.

Preferably, when the edge classification section judges that the identification data and the quantized data of a watching pixel and peripheral pixels of the watching pixel of the compressed image satisfy conditions of the identification data and the quantized data, the conditions defined beforehand concerning various patterns of edges, the edge classification section judges that an edge pattern satisfying the conditions in the expanded image is detected and performs the edge classification of the watching pixel in conformity with a classification method defined concerning the pattern beforehand.

Preferably, the half tone region is quantized and decoded in conformity with a BTC system, and the high resolution region is quantized based on a density pattern produced by means of an Image data value to be decoded by prediction of the density pattern based on the quantized data.

Preferably, the compressed image is an original image compressed by quantization and subjected to resolution conversion to have lower resolution than that of the original image, and the expanded image is the compressed image expanded by decoding and subjected to resolution conversion to have the same resolution as that of the original image; and the edge classification section detects the edge pattern of the expanded image subjected to the resolution conversion to have the same resolution as that of the original image to perform the edge classification.

Preferably, the edge classification includes a thin line of a 1-pixel width, a thin line of a 2-pixel width, an outer edge, or an inner edge.

According to the present invention, edge classification can be performed in the state of a compressed image. Consequently, because the data quantity for performing the classification processing is less than that for performing the edge classification with the use of an expanded image, the edge classification can be performed with a simple configuration.

According to a second aspect of the present invention, the following edge classification method is provided. The edge classification method includes the steps of: detecting an edge pattern included in an expanded image expanded from a compressed image by using identification data to indicate whether each of pixels of the compressed image is a half tone region or a high resolution region, and quantized data of each of the pixels; and performing edge classification according to the detected edge pattern.

Preferably, at the step of detecting the edge pattern, when the identification data and the quantized data of a watching pixel and peripheral pixels of the compressed image is judged to satisfy conditions of the identification data and the quantized data, the conditions defined beforehand concerning various patterns of edges, an edge pattern satisfying the conditions in the expanded image is judged to be detected; and at the step of performing the edge classification, the edge classification of the watching pixel is performed in conformity with a classification method defined concerning the detected edge pattern beforehand.

Preferably, the half tone region is quantized and decoded in conformity with a BTC system, and the high resolution region is quantized based on a density pattern produced by means of an image data value to be decoded by prediction of the density pattern based on the quantized data.

Preferably, the compressed image is an original image compressed by quantization and subjected to resolution conversion to have lower resolution than that of the original image, and the expanded image is the compressed image expanded by decoding and subjected to resolution conversion to have the same resolution as that of the original image; and at the step of detect the edge pattern, the edge pattern of the expanded image subjected to the resolution conversion to have the same resolution as that of the original image.

Preferably, the edge classification includes a thin line of a 1-pixel width, a thin line of a 2-pixel width, an outer edge, or an inner edge.

According to the present invention, edge classification can be performed in the state of a compressed image. Consequently, because the data quantity for performing the classification processing is less than that for performing the edge classification with the use of an expanded image, the edge classification can be performed with a simple configuration.

The entire disclosure of Japanese Patent Application No. 2008-208404 filed on Aug. 13, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus comprising:
an image compression conversion circuit which performs compression processing and low resolution conversion on an input image to generate a compressed image;
an image memory which stores the compressed image;
an image expansion conversion circuit which performs expansion processing on the compressed image read out from the image memory and performs resolution conversion to return a resolution thereof to an original resolution; and
an edge classification circuit which detects an edge pattern included in an expanded image when the compressed image is expanded and classifies an edge according to the edge pattern;
wherein:
the image compression conversion circuit: (i) judges whether each block unit, which comprises a plurality of pixels in the input image, is a half tone region or a high resolution region according to a predetermined condition, (ii) converts data values of the plurality of pixels included in each block unit into a data value of one pixel by quantizing the data values according to a predetermined condition depending on whether the block unit is judged as the half tone region or the high resolution region to generate quantized data which comprises one pixel in the compressed image, and (iii) sets identification data in each pixel in the compressed image to identify whether the pixel is the half tone region or the high resolution region; and
the edge classification circuit, with respect to each pixel in the compressed image, (i) judges whether the identification data and the quantized data of a watching pixel and a surrounding pixel in a predetermined region from the watching pixel fit a predetermined condition of edge pattern, (ii) detects a pixel in the expanded image which corresponds to the watching pixel as the edge pattern when the identification data and the quantized data are judged as fitting the predetermined condition, and (iii) performs edge classification of the pixel in the expanded image which corresponds to the watching pixel according to the fitted predetermined condition.

2. The image processing apparatus according to claim 1, wherein the image compression conversion circuit generates the quantized data with a BCT system for a block unit which is judged as the half tone region, and generates the quantized data based on a density pattern in a region of the block unit formed by using data values of pixels included in the block unit for a block unit which is judged as the high resolution region.

3. The image processing apparatus according to claim 1, wherein the edge which the edge classification circuit classifies includes one of a thin line of 1-pixel width, a thin line of 2-pixel width, an outer edge, and an inner edge.

4. An edge classification method of an image processing apparatus, the method comprising:
- performing image compression by performing compression processing and low resolution conversion on an input image to generate a compressed image;
- storing the compressed image in an image memory;
- performing image expansion by performing expansion processing on the compressed image read out from the image memory and performing resolution conversion to return a resolution thereof to an original resolution; and
- performing edge classification by detecting an edge pattern included in an expanded image when the compressed image is expanded and by classifying an edge according to the edge pattern;

wherein:
- performing the image compression comprises: (i) judging whether each block unit, which comprises a plurality of pixels in the input image, is a half tone region or a high resolution region according to a predetermined condition, (ii) converting data values of the plurality of pixels included in each block unit into a data value of one pixel by quantizing the data values according to a predetermined condition depending on whether the block unit is judged as the half tone region or the high resolution region to generate quantized data which comprises one pixel in the compressed image, and (iii) setting identification data in each pixel in the compressed image to identify whether the pixel is the half tone region or the high resolution region; and
- performing the edge classification comprises, with respect to each pixel in the compressed image, (i) judging whether the identification data and the quantized data of a watching pixel and a surrounding pixel in a predetermined region from the watching pixel fit a predetermined condition of an edge pattern, (ii) detecting a pixel in the expanded image which corresponds to the watching pixel as the edge pattern when the identification data and the quantized data are judged as fitting the predetermined condition, and (iii) performing edge classification of the pixel in the expanded image which corresponds to the watching pixel according to the fitted predetermined condition.

* * * * *